US010891662B2

(12) United States Patent
Bayer et al.

(10) Patent No.: US 10,891,662 B2
(45) Date of Patent: Jan. 12, 2021

(54) ADVERTISING WITH VIDEO AD CREATIVES

(71) Applicant: Google LLC, Mountain View, CA (US)

(72) Inventors: Jason S. Bayer, Mountain View, CA (US); Ronojoy Chakrabarti, Santa Clara, CA (US); Keval Desai, San Francisco, CA (US); Manish P Gupta, Santa Clara, CA (US); Jill A Huchital, Saratoga, CA (US); Willard V T Rusch, II, Woodside, CA (US)

(73) Assignee: Google LLC, Mountain View, CA (US)

( * ) Notice: Subject to any disclaimer, the term of this patent is extended or adjusted under 35 U.S.C. 154(b) by 1143 days.

(21) Appl. No.: 14/251,824

(22) Filed: Apr. 14, 2014

(65) Prior Publication Data

US 2014/0222550 A1    Aug. 7, 2014

Related U.S. Application Data

(63) Continuation of application No. 14/246,826, filed on Apr. 7, 2014, now abandoned, which is a continuation
(Continued)

(51) Int. Cl.
*G06Q 30/00* (2012.01)
*G06Q 30/02* (2012.01)
(Continued)

(52) U.S. Cl.
CPC ......... *G06Q 30/0277* (2013.01); *G06Q 30/02* (2013.01); *G06Q 30/0242* (2013.01);
(Continued)

(58) Field of Classification Search
CPC .......... G06Q 30/0277; G06Q 30/0242; G06Q 30/02; H04N 21/435; H04N 21/466;
(Continued)

(56) References Cited

U.S. PATENT DOCUMENTS 5,794,210 A    8/1998    Goldhaber et al.
5,848,396 A    12/1998    Gerace
(Continued)

FOREIGN PATENT DOCUMENTS

JP    2002259790 A    3/2001
JP    2001-285835    12/2001
(Continued)

OTHER PUBLICATIONS

"The HotMedia architecture: progressive and interactive rich media for the Internet" (Year: 2001).*
(Continued)

*Primary Examiner* — Maria V Vanderhorst
(74) *Attorney, Agent, or Firm* — Foley & Lardner LLP

(57) ABSTRACT

The serving of advertisements with (e.g., on) video documents may be improved in a number of ways. For example, a system may (a) accept information defining at least one ad spot associated with at least one instance of an video document, (b) accept offers to have advertisements served in the ad spot(s), and (c) arbitrate among competing advertisements, using at least the offers, to determine at least one advertisement to be served in that ad spot(s). As another example, a system may (a) accept relevance information for an advertisement, (b) determine at least one video document using the accepted relevance information, (c) present information about the video document(s) to an advertiser associated with the advertisement, and (d) accept, from the advertiser, an offer to have its advertisement served with at least one of the video document(s) accepted. As yet another example, a system may (a) accept relevance information for an video document, (b) determine a plurality of advertisements relevant to the video document using the relevance information and serving constraints of the advertisements, and (c) select at least one of the determined relevant adver-
(Continued)

tisements to be served with the video document. Examples of video documents include video files published on the Internet, television programs, live or recorded talk shows, video-voice mail, segments of an video conversation, etc.

14 Claims, 13 Drawing Sheets

Related U.S. Application Data of application No. 14/193,695, filed on Feb. 28, 2014, now Pat. No. 10,108,988, which is a continuation of application No. 11/323,327, filed on Dec. 30, 2005, now abandoned.

(51) Int. Cl.
| | |
|---|---|
| H04N 7/173 | (2011.01) |
| H04N 21/231 | (2011.01) |
| H04N 21/234 | (2011.01) |
| H04N 21/25 | (2011.01) |
| H04N 21/258 | (2011.01) |
| H04N 21/262 | (2011.01) |
| H04N 21/266 | (2011.01) |
| H04N 21/2665 | (2011.01) |
| H04N 21/2668 | (2011.01) |
| H04N 21/433 | (2011.01) |
| H04N 21/44 | (2011.01) |
| H04N 21/466 | (2011.01) |
| H04N 21/81 | (2011.01) |
| H04N 21/435 | (2011.01) |
| G05B 19/418 | (2006.01) |

(52) U.S. Cl.
CPC ... *H04N 7/17318* (2013.01); *H04N 21/23106* (2013.01); *H04N 21/23424* (2013.01); *H04N 21/252* (2013.01); *H04N 21/25891* (2013.01); *H04N 21/2665* (2013.01); *H04N 21/2668* (2013.01); *H04N 21/26208* (2013.01); *H04N 21/26603* (2013.01); *H04N 21/435* (2013.01); *H04N 21/4331* (2013.01); *H04N 21/44016* (2013.01); *H04N 21/466* (2013.01); *H04N 21/4667* (2013.01); *H04N 21/812* (2013.01)

(58) Field of Classification Search
CPC ......... H04N 7/17318; H04N 21/23106; H04N 21/23424; H04N 21/252; H04N 21/25891; H04N 21/26208; H04N 21/26603; H04N 21/2665; H04N 21/2668; H04N 21/4331; H04N 21/44016; H04N 21/4667; H04N 21/812
See application file for complete search history.

(56) References Cited

U.S. PATENT DOCUMENTS

| | | | |
|---|---|---|---|
| 5,918,014 | A | 6/1999 | Robinson |
| 5,937,390 | A | 8/1999 | Hyodo |
| 5,937,392 | A | 8/1999 | Alberts |
| 5,948,061 | A | 9/1999 | Merriman et al. |
| 6,006,197 | A | 12/1999 | D'Eon et al. |
| 6,008,222 | A | 12/1999 | Culliss |
| 6,009,409 | A | 12/1999 | Adler et al. |
| 6,014,665 | A | 1/2000 | Culliss |
| 6,078,916 | A | 6/2000 | Culliss |
| 6,097,566 | A | 8/2000 | Heller et al. |
| 6,182,068 | B1 | 1/2001 | Culliss |
| 6,260,064 | B1 | 7/2001 | Kurzrok |
| 6,275,806 | B1 | 8/2001 | Pertrushin |
| 6,285,999 | B1 | 9/2001 | Page |
| 6,338,066 | B1 | 1/2002 | Martin et al. |
| 6,356,879 | B2 | 3/2002 | Aggarwal et al. |
| 6,430,539 | B1 | 8/2002 | Lazarus et al. |
| 6,539,377 | B1 | 3/2003 | Culliss |
| 6,567,786 | B1 | 5/2003 | Bibelnieks et al. |
| 6,684,249 | B1 | 1/2004 | Frerichs et al. |
| 6,708,335 | B1 | 3/2004 | Ozer et al. |
| 6,760,916 | B2 | 7/2004 | Holtz et al. |
| 6,857,007 | B1 | 2/2005 | Bloomfield |
| 6,963,848 | B1 | 11/2005 | Brinkerhoff |
| 7,007,074 | B2 | 2/2006 | Radwin |
| 7,130,808 | B1 | 10/2006 | Ranka et al. |
| 7,136,875 | B2 | 11/2006 | Anderson et al. |
| 7,370,002 | B2 | 5/2008 | Heckerman et al. |
| 7,383,258 | B2 | 6/2008 | Harik et al. |
| 7,406,434 | B1 | 7/2008 | Chang et al. |
| 7,415,423 | B2 | 8/2008 | Ranka et al. |
| 7,526,545 | B2 | 4/2009 | Jerome |
| 7,853,255 | B2 | 12/2010 | Karaoguz et al. |
| 8,171,509 | B1 | 5/2012 | Girouard et al. |
| 8,195,133 | B2 | 6/2012 | Ramer et al. |
| 8,386,386 | B1 | 2/2013 | Zhu |
| 8,903,716 | B2 | 12/2014 | Chen et al. |
| 2001/0018693 | A1 | 8/2001 | Jain et al. |
| 2001/0049620 | A1 | 12/2001 | Blasko |
| 2002/0033844 | A1 | 3/2002 | Levy et al. |
| 2002/0087403 | A1 | 7/2002 | Meyers et al. |
| 2002/0103698 | A1 | 8/2002 | Cantrell |
| 2002/0104096 | A1* | 8/2002 | Cramer ............ H04N 21/8153 725/113 |
| 2002/0147637 | A1 | 10/2002 | Kraft et al. |
| 2003/0012549 | A1 | 1/2003 | Ohnuma |
| 2003/0023598 | A1 | 1/2003 | Janakiraman et al. |
| 2003/0028871 | A1 | 2/2003 | Wang et al. |
| 2003/0032409 | A1 | 2/2003 | Hutcheson et al. |
| 2003/0046161 | A1 | 3/2003 | Kamangar et al. |
| 2003/0149975 | A1 | 8/2003 | Eldering et al. |
| 2003/0158789 | A1 | 8/2003 | Miura et al. |
| 2004/0025180 | A1 | 2/2004 | Begeja et al. |
| 2004/0054577 | A1 | 3/2004 | Inoue et al. |
| 2004/0059708 | A1 | 3/2004 | Dean et al. |
| 2004/0059712 | A1 | 3/2004 | Dean et al. |
| 2004/0158865 | A1 | 8/2004 | Kubler et al. |
| 2004/0230994 | A1 | 11/2004 | Urdang et al. |
| 2004/0250281 | A1* | 12/2004 | Feininger ................ H04N 5/76 725/58 |
| 2004/0267723 | A1 | 12/2004 | Bharat |
| 2005/0078088 | A1 | 4/2005 | Davis et al. |
| 2005/0080787 | A1 | 4/2005 | Ramirez |
| 2005/0080878 | A1 | 4/2005 | Cunningham et al. |
| 2005/0137958 | A1 | 6/2005 | Huber et al. |
| 2005/0251444 | A1 | 11/2005 | Varian et al. |
| 2006/0026071 | A1 | 2/2006 | Radwin |
| 2006/0212897 | A1 | 9/2006 | Li et al. |
| 2006/0287916 | A1 | 12/2006 | Starr et al. |
| 2006/0288100 | A1 | 12/2006 | Carson et al. |
| 2007/0038567 | A1 | 2/2007 | Allaire et al. |
| 2007/0067297 | A1 | 3/2007 | Kublickis |
| 2007/0097975 | A1 | 5/2007 | Rakers et al. |
| 2007/0127688 | A1 | 6/2007 | Doulton |
| 2007/0156514 | A1 | 7/2007 | Wright et al. |
| 2007/0156621 | A1 | 7/2007 | Wright et al. |
| 2007/0156887 | A1 | 7/2007 | Wright et al. |
| 2008/0193016 | A1 | 8/2008 | Lim et al. |
| 2010/0082439 | A9 | 4/2010 | Patel et al. |
| 2011/0029666 | A1* | 2/2011 | Lopatecki ............ G06F 15/16 709/224 |
| 2012/0265528 | A1 | 10/2012 | Gruber et al. |
| 2013/0117022 | A1 | 5/2013 | Chen et al. |
| 2013/0275164 | A1 | 10/2013 | Gruber et al. |
| 2013/0304758 | A1 | 11/2013 | Gruber et al. |
| 2017/0092278 | A1 | 3/2017 | Evermann et al. |
| 2017/0110130 | A1 | 4/2017 | Sharifi et al. |
| 2017/0132019 | A1 | 5/2017 | Karashchuk et al. |

FOREIGN PATENT DOCUMENTS

| | | |
|---|---|---|
| JP | 2002-056280 | 2/2002 |
| JP | 2002-140359 | 5/2002 |

(56) References Cited

FOREIGN PATENT DOCUMENTS

| | | |
|---|---|---|
| JP | 2002-044631 | 8/2002 |
| JP | 2002-259790 | 9/2002 |
| JP | 2002-530700 | 9/2002 |
| JP | 2003-145319 | 7/2003 |
| JP | 2003-316998 | 7/2003 |
| JP | 2003-242372 | 8/2003 |
| JP | 2003242372 | 8/2003 |
| JP | 2004-364001 | 12/2004 |
| JP | 2005-073003 | 3/2005 |
| JP | 2005-513840 | 5/2005 |
| JP | 2005-536790 | 12/2005 |
| KR | 200188125 | 9/2001 |
| KR | 200335269 | 5/2003 |
| WO | WO-99/66719 | 12/1999 |
| WO | WO-01/09789 | 2/2001 |
| WO | WO-01/15053 | 3/2001 |
| WO | WO-01/50296 | 7/2001 |
| WO | WO-02/21839 | 3/2002 |
| WO | WO-03/023680 | 3/2003 |
| WO | WO-03/052552 A2 | 6/2003 |
| WO | WO-03/052651 | 6/2003 |
| WO | WO-03/084219 | 10/2003 |
| WO | WO-2004/019171 | 3/2004 |
| WO | WO-2004/5036384 | 4/2004 |
| WO | WO-2005/048602 | 5/2005 |

OTHER PUBLICATIONS

Japanese Decision of Rejection on 2014-039154 dated Dec. 21, 2015.
Examiner's First Report for Australian Patent Application No. 2011203560, dated Feb. 7, 2012 (3 pgs.).
Examiner's First Report on Australian Patent Application No. 2006332714, dated •Oct. 13, 2009 (3 pgs.).
First Office Action for European Patent Application No. 06 848 336.1, dated Feb. 23, 2012 (6 pgs.).
First Office Action for Japanese Patent Application No. 2008-548767, dated Mar. 13, 2012 (3 pgs.) with translation (3 pgs.).
Indian Examination Report on 1610/MUMNP/2008 dated Aug. 16, 2013.
International Search Report on PCT/US06/49567 dated Sep. 11, 2007 (2 pgs.).
Notice of Final Rejection for Korean Patent Application No. 10-2008-7018838, dated Nov. 30, 2011 (3 pgs.) with translation (3 pgs.).
Notice of Preliminary Rejection for Korean Patent Application No. 10-2008-7018838, dated May 20, 2010 (8 pgs.) with translation (9 pgs.).
Notice of Preliminary Rejection for Korean Patent Application No. 10-2008-7018838, dated Feb. 28, 2011 (4 pgs.) with translation (5 pgs.).
Notice of Preliminary Rejection to Korean Patent Application Serial No. 10-2012-7008761, dated May 7, 2013 (5 pages), with translation (6 pages).
Notice of Reasons for Rejection for Japanese Patent Application No. 2008-548767, dated Nov. 16, 2010 (5 pgs.) with translation (6 pgs.).
Notification of the First Office Action for Chinese Patent Application No. 200680053601.2, dated Sep. 9, 2010 (5 pgs.) with translation (4 pgs.).
Second Examiner's Report for Australian Patent Application No. 2006332714, dated Apr. 11, 2011 (3 pgs.).
Summons to attend oral proceedings pursuant to Rule 115(1) EPC in European Patent Application No. 06848336.1-1958 (6 pages).
Supplementary European Search Report for European Patent Application No. 06848336.1-2221, dated May 18, 2011 (8 pgs.).
Translation of Final Office Action for Japanese Patent Application No. 2008-548767, dated Apr. 2, 2013 (2 pgs.).
US Office Action dated Oct. 10, 2013 in U.S. Appl. No. 11/323,327.
Written Opinion on PCT/US06/49567 dated Sep. 11, 2007 (5 pgs.).
Canadian Office Action on 2,635,990 dated Jan. 29, 2015.
Japanese Office Action on 2014-039154 dated Feb. 24, 2015.
Notice of Preliminary Rejection for Korean Patent Applciation No. 10-2008-7018838, dated May 20, 2010 (8 pgs.) with translation (9 pgs).
Office Action on U.S. Appl. No. 11/323,327 dated Dec. 21, 2011.
Office Action on U.S. Appl. No. 11/323,327 dated Mar. 5, 2009.
Office Action on U.S. Appl. No. 11/323,327 dated Apr. 27, 2011.
Office Action on U.S. Appl. No. 11/323,327 dated May 13, 2010.
Office Action on U.S. Appl. No. 11/438,473 dated Mar. 25, 2011.
Office Action on U.S. Appl. No. 11/438,473 dated May 3, 2012.
Office Action on U.S. Appl. No. 11/438,473 dated Aug. 22, 2011.
Office Action on U.S. Appl. No. 11/438,473 dated Aug. 25, 2010.
Office Action on U.S. Appl. No. 11/800,037 dated Nov. 23, 2011.
Office Action on U.S. Appl. No. 11/800,037 dated May 26, 2011.
Office Action on U.S. Appl. No. 11/438,473 dated Jul. 21, 2016.
Canadian Office Action on 2,635,990 dated Feb. 21, 2014.
European Search Report on Application No. 14001633.8 dated Sep. 4, 2014.
Notice of Final Preliminary Rejection for Korean Patent Application No. 10-2012-7008761, dated Jun. 27, 2014 (16 pgs.) with translation (14 pgs.).
Notice of Final Rejection for Korean Patent Application No. 10-2012-7008761, dated Mar. 26, 2014 (3 pgs) with translation (2 pgs).
U.S. Appl. No. 11/323,327, filed Dec. 30, 2005.
U.S. Appl. No. 11/438,473, filed May 22, 2006.
U.S. Appl. No. 11/800,037, filed May 3, 2007.
U.S. Appl. No. 14/193,695, filed Feb. 28, 2014.
U.S. Appl. No. 14/246,826, filed Apr. 7, 2014.
Office Action on U.S. Appl. No. 14/193,695 dated Aug. 11, 2016.
Office Action on U.S. Appl. No. 14/246,826 dated Oct. 3, 2016.
First Office Action for application 2016-080241 dated May 22, 2017, 5 pages.
US Notice of Allowance on U.S. Appl. No. 14/193,695 dated Apr. 18, 2017.
US Notice of Allowance on U.S. Appl. No. 14/193,695 dated May 9, 2017.
US Office Action on U.S. Appl. No. 11/438,473 dated Apr. 25, 2017.
US Office Action on U.S. Appl. No. 14/193,695 dated Jan. 27, 2017.
US Office Action on U.S. Appl. No. 14/246,826 dated Mar. 9, 2017.
"Walmart and Google to offer voice-enabled shopping", BBC News, Aug. 23, 2017 (10 pages).
Crist, Ry, "Logitech Harmony's Alexa Skill just got a whole lot better", cnet, Jul. 13, 2017 (2 pages).
Gibbs, Samuel, "Your Facebook Messenger app is about to be filled with ads", The Guardian, Jul. 12, 2017 (3 pages).
Hardwick, Tim, "Facebook Smart Speaker Coming Next Year With 15-inch Touch Panel", MacRumors, Jul. 25, 2017 (5 pages).
International Preliminary Report on Patentability dated Jul. 10, 2008 issued in International Application No. PCT/US2006/062710 (corresponding to U.S. Appl. No. 11/321,046) 7 pages.
International Preliminary Report on Patentability dated Jul. 10, 2008, issued in International Application No. PCT/US2006/062673 (corresponding U.S. Appl. No. 11/321,064), 7 pages.
Kelion, Leo, "Amazon's race to make Alexa smarter", BBC News, Jul. 28, 2017 (8 pages).
M. Fang et al., Computing Iceberg Queries Efficiently, Proceedings of the 24th Very Large Data Bases Conference, 1998, 12 Pages.
S. Brin and L. Page: The Anatomy of a Large-Scale Hyptertextual Search Engine, 7th International World Wide Web Conference, 1998, 20 pages.
Shun-Zheng Yu et al., "Dynamic Web pages for location-based services": Book (Proceedings of the IASTED International Conference on Wireless and Optical Communications), pp. 457-63: Jul. 17-19, 2002.
US Notice of Allowance on U.S. Appl. No. 11/167,581 dated Jun. 8, 2010, 12 pages.
US Office Action on U.S. Appl. No. 11/321,046, dated Feb. 19, 2009.
US Office Action on U.S. Appl. No. 11/321,064, dated Feb. 18, 2009.
US Office Action on U.S. Appl. No. 11/321,076, dated Feb. 18, 2009.
US Office Action on U.S. Appl. No. 11/321,076, dated May 6, 2010, 17 pages.

(56) References Cited

OTHER PUBLICATIONS

"Amazon and Google Want to Turn Their Smart Home Speakers Into Telephone Replacements—Mac Rumors" MacRumors, 9 pages.
"Apple Patent Reveals a New Security Feature Coming to Siri" 6 pages.
"Introducing Echo Look Hands-Free Camera and Style Assistant" 1996-2017, Amazon.com, Inc. 5 pages.
"The Patent Behind Google Home's New Feature of Understanding Different Voices in the Home Surfaced Today", Apr. 20, 2017, 5 pages.
Broussard, Mitchel, "Chatbot-Like Siri Patent Includes Intelligent Image, Video, and Audio Recognition Within Messages", MacRumors, May 11, 2017, 11 pages.
Chen, Yilun Lulu, "Alibaba Challenges Google, Amazon With New Echo-Like Device", Bloomberg, Jul. 5, 2017, 3 pages.
Close, "Amazon Echo Will Give You These Deals If You Order Through Alexa This Weekend," Web Article, Nov. 18, 2016, Time.com (2 pages).
Collins, Terry "Can Twitter Save itself? The Social Network is Slowly gaining users, but still Lags Far Behind Rivals. Is a Turnaround Possible?" 3 pages.
Cook, "A Siri for advertising: These mobile ads talk back to you," Web Article, Apr. 1, 2013, Geekwire.com (7 pages).
Forrest, Conner, "Essential Home wants to be 'bridge' between Amazon Alexa, Apple's Siri, and Google Assistant," TechRepublic, May 31, 2017, 9 pages.
Foxx, Chris, "Apple reveals HomePod smart speaker", BBC, Jun. 5, 2017, 9 pages.
Gebhart, Andrew, "Google Assistant is spreading, but it needs its own 'Echo Dot'", Cnet, May 20, 2017, 6 pages.
Gebhart, Andrew, "Google Home to the Amazon Echo: 'Anything you can do . . . '" Cnet, May 18, 2017, 7 pages.
Golgowski, Nina, "This Burger King Ad Is Trying to Control Your Google Home Device", Apr. 12, 2017, 7 pages.
Google Developers Newsletter "Google Assistant SDK", developers.google.com, 2 pages.
Gurma, Mark and Webb, Alex, "Apple Is Manufacturing a Siri Speaker to Outdo Google and Amazon", Bloomberg, May 31, 2017, 3 pages.
Koetsier, John, "Ads on Amazon Echo: Wendy's, ESPN, and Progressive Among Brands Testing", Forbes, May 11, 2017, 3 pages.
Larson, Selena "Google Home Now Recognizes your Individual Voice" dated Apr. 20, 2017, 3 pages.
Lee, Dave, "The five big announcements from Google I/O", BBC, May 18, 2017, 11 pages.
Nieva, Richard, "Google Home and eBay can tell you how much that's worth", 3 pages.
Perez, Sarah, "The first ad network for Alexa Skills shuts down following Amazon's policy changes", Tech Crunch, Jun. 15, 2017, 8 pages.
Porter, Jon, "Amazon Echo Show release date, price, news and features", Tech Radar, Jun. 26, 2017, 11 pages.
Purcher, Jack, Today Google Home's Virtual Assistant can learn its Owner's voice for Security Reasons like Apple's Patent Pending Idea, Apr. 20, 2017, 4 pages.
Sablich, Justin, "Planning a Trip With the Help of Google Home", New York Times, dated May 31, 2017, 6 pages.
Seifert, Dan "Samsung's New Virtual Assistant Will Make Using Your Phone Easier", Mar. 20, 2017, 7 pages.
Sherr, Ian "IBM Built a Voice Assistant for Cybersecurity" dated Feb. 13, 2017, 4 pages.
Siegal, Daniel, "IP Attys Load Up Apps' Legal Challenges At Silicon Beach" 6 pages.
Simonite, "How Alexa, Siri, and Google Assistant Will Make Money Off You," Web Article, May 31, 2016, technologyreview.com (11 pages).
Simonite, "How Assistant Could End Up Eating Google's Lunch," Web Article, Sep. 23, 2016, technologyreview.com (9 pages).
Smith, Dave, "The Amazon Echo got 2 incredibly useful features thanks to a new update", Business Insider, Jun. 1, 2017, 2 pages.
Willens, Max, "For publishers, Amazon Alexa holds promise but not much money (yet)", Digiday, Jul. 6, 2017, 5 pages.
Dimitrova et al., "Applications of Video-Content Analysis and Retrieval", IEEE Xplore, Jul.-Sep. 2002 (14 pages).
Final Office Action for U.S. Appl. No. 15/662,005 dated Nov. 21, 2019 (20 pages).
Final Office Action for U.S. Appl. No. 16/172,010 dated Jan. 2, 2020 (17 pages).
Krikke, Jan, "Applications: Streaming Video Transforms the Media Industry", IEEE Computer Graphics and Applications, edited by Mike Potel, Jul./Aug. 2004, pp. 6-12 (7 pages).
Non-Final Office Action for U.S. Appl. No. 15/662,005 dated Jun. 27, 2019 (23 pages).
Notice of Allowance for U.S. Appl. No. 15/662,005 dated Apr. 7, 2020 (7 pages).
Notice of Allowance for U.S. Appl. No. 15/662,005 dated Aug. 28, 2020 (8 pages).
Notice of Allowance tor U.S. Appl. No. 15/662,005 dated Feb. 13, 2020 (10 pages).
Notice of Allowance for U.S. Appl. No. 15/662,005 dated Jun. 4, 2020 (6 pages).

* cited by examiner

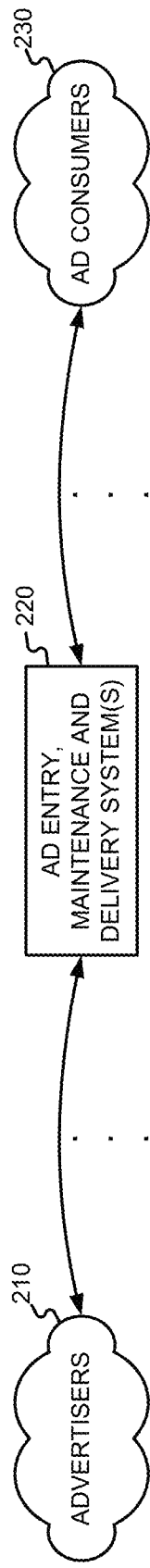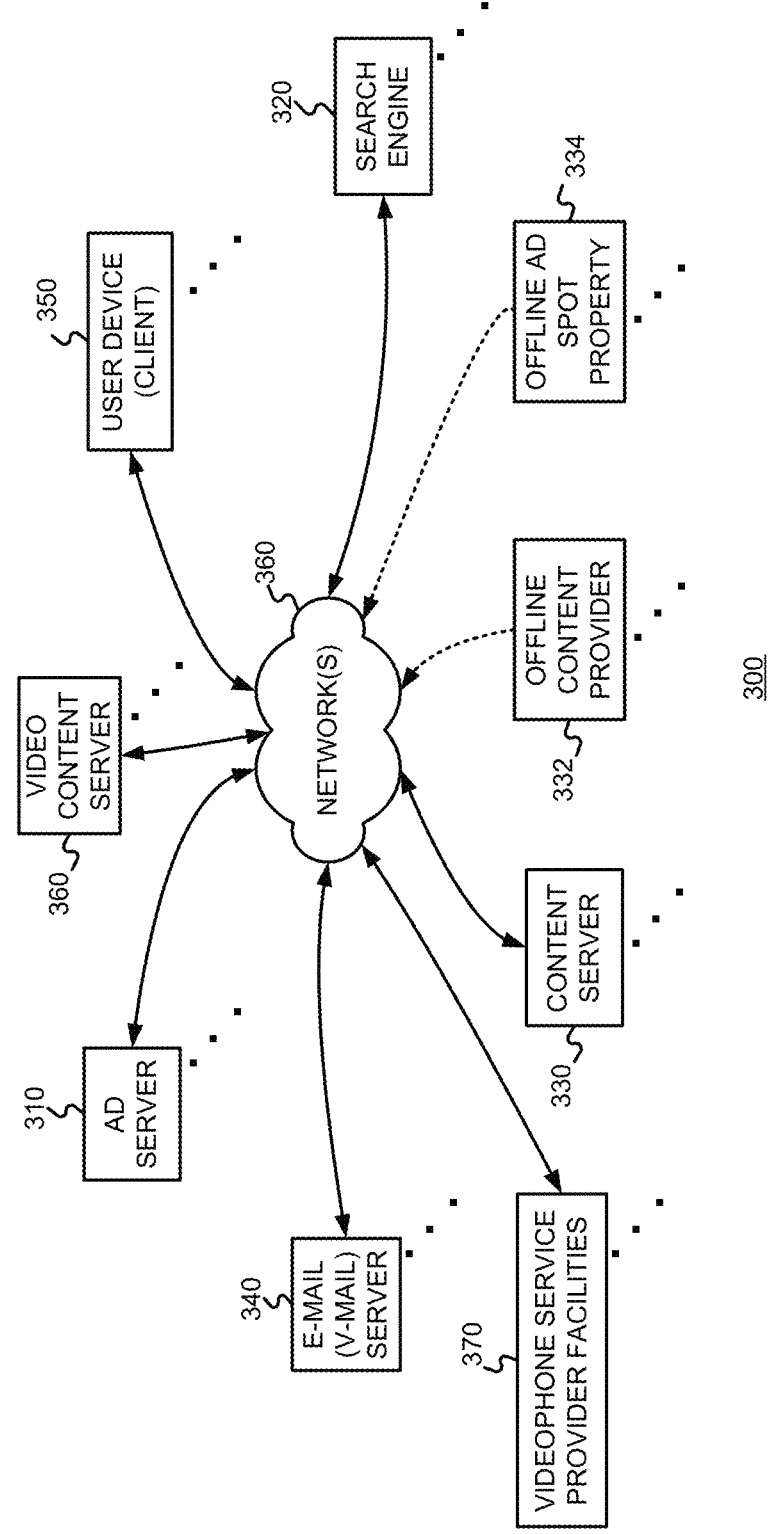

ADVERTISING WITH VIDEO AD CREATIVES

§ 0. RELATED APPLICATIONS

This present application claims priority to and is a continuation of U.S. patent application Ser. No. 14/246,826, entitled, "IMPROVED ADVERTISING WITH VIDEO AD CREATIVES" filed on Apr. 7, 2014, which is a continuation of U.S. patent application Ser. No. 14/193,695, entitled, "IMPROVED ADVERTISING WITH VIDEO AD CREATIVES" filed on Feb. 28, 2014, which is a continuation of U.S. patent application Ser. No. 11/323,327, entitled, "IMPROVED ADVERTISING WITH VIDEO AD CREATIVES" filed on Dec. 30, 2005. The disclosures of each of U.S. patent application Ser. No. 14/246,826, U.S. patent application Ser. No. 14/193,695 and U.S. patent application Ser. No. 11/323,327 are incorporated herein by reference in their entirety.

§ 1. BACKGROUND OF THE INVENTION

§ 1.1 Field of the Invention

The present invention concerns advertising, such as online advertising for example. In particular, the present invention concerns improving the utility of advertisements to end users.

§ 1.2 Background Information

Advertising using traditional media, such as television, radio, newspapers and magazines, is well known. Unfortunately, even when armed with demographic studies and entirely reasonable assumptions about the typical audience of various media outlets, advertisers recognize that much of their ad budget is simply wasted. Moreover, it is very difficult to identify and eliminate such waste.

Recently, advertising over more interactive media has become popular. For example, as the number of people using the Internet has exploded, advertisers have come to appreciate media and services offered over the Internet as a potentially powerful way to advertise.

Interactive advertising provides opportunities for advertisers to target their ads to a receptive audience. That is, targeted ads are more likely to be useful to end users since the ads may be relevant to a need inferred from some user activity (e.g., relevant to a user's search query to a search engine, relevant to content in a document requested by the user, etc.). Query keyword targeting has been used by search engines to deliver relevant ads. For example, the AdWords advertising system by Google Inc. of Mountain View, Calif. (referred to as "Google"), delivers ads targeted to keywords from search queries. Similarly, content targeted ad delivery systems have been proposed. For example, U.S. patent application Ser. No. 10/314,427 (incorporated herein, in its entirety, by reference and referred to as "the '427 application"), titled "METHODS AND APPARATUS FOR SERVING RELEVANT ADVERTISEMENTS", filed on Dec. 6, 2002 and listing Jeffrey A. Dean, Georges R. Harik and Paul Buchheit as inventors; and Ser. No. 10/375,900 (incorporated herein, in its entirety, by reference and referred to as "the '900 application"), titled "SERVING ADVERTISEMENTS BASED ON CONTENT," filed on Feb. 26, 2003 and listing Darrell Anderson, Paul Buchheit, Alex Carobus, Claire Cui, Jeffrey A. Dean, Georges R. Harik, Deepak Jindal and Narayanan Shivakumar as inventors, describe methods and apparatus for serving ads relevant to the content of a document, such as a Web page for example. Content targeted ad delivery systems, such as the AdSense advertising system by Google for example, have been used to serve ads on Web pages.

As can be appreciated from the foregoing, serving ads relevant to concepts of text in a text document and serving ads relevant to keywords in a search query are useful because such ads presumably concern a current user interest. Consequently, such online advertising has become increasingly popular. Moreover, advertising using other targeting techniques, and even untargeted online advertising, has become increasingly popular.

Currently, ads delivered with video content, such as television broadcasts for example, are typically based on a "reservation" model. That is, an advertiser reserves a spot in the televised broadcast for a fixed fee. Unfortunately, however, the reservation model doesn't necessarily maximize revenue for the video content publisher because many advertisers that don't have the resources to negotiate agreements for such ad spots don't compete for those ad spots. Further, from the perspective of the end-user (i.e., the person or persons to whom the audio content is delivered), the ad could be totally irrelevant or not as useful as it could be.

Existing advertising systems, such as systems that insert ads into video content (a "video document"), could be improved. For example, it would be useful to improve the relevancy of ads served in (or with) a video document. It would also be useful to improve the value, in terms of potential advertising revenue, of such a video document. It would be especially useful to improve the value, in terms of potential advertising revenue, of an aggregate of multiple instances of a video document.

§ 2. SUMMARY OF THE INVENTION

Embodiments consistent with the present invention may be used to improve the serving of advertisements with (e.g., on) video documents. For example, at least some embodiments consistent with the present invention may (a) accept information defining at least one ad spot associated with at least one instance of an video document, (b) accept offers to have advertisements served in the ad spot(s), and (c) arbitrate among competing advertisements, using at least the offers, to determine at least one advertisement to be served in that ad spot(s). As another example, at least some embodiments consistent with the present invention may (a) accept relevance information for an advertisement, (b) determine at least one video document using the accepted relevance information, (c) present information about the video document(s) to an advertiser associated with the advertisement, and (d) accept, from the advertiser, an offer to have its advertisement served with at least one of the video document(s) accepted. As yet another example, at least some embodiments consistent with the present invention may (a) accept relevance information for an video document, (b) determine a plurality of advertisements relevant to the video document using the relevance information and serving constraints of the advertisements, and (c) select at least one of the determined relevant advertisements to be served with the video document. Examples of video documents include video files published on the Internet, television programs, live or recorded talk shows, video-voice mail, segments of an video conversation, etc.

§ 3. BRIEF DESCRIPTION OF THE DRAWINGS

FIG. 2 is a diagram showing parties or entities that can interact with an advertising system.

FIG. 3 is a diagram illustrating an environment in which, or with which, embodiments consistent with the present invention may operate.

FIG. 5 illustrates an exemplary data structure for storing video document relevancy information in a manner consistent with the present invention.

FIG. 6 illustrates an exemplary data structure for storing ad spot information in a manner consistent with the present invention.

FIG. 7 illustrates an exemplary data structure for storing ad information in a manner consistent with the present invention.

§ 4. DETAILED DESCRIPTION

Figure 1:
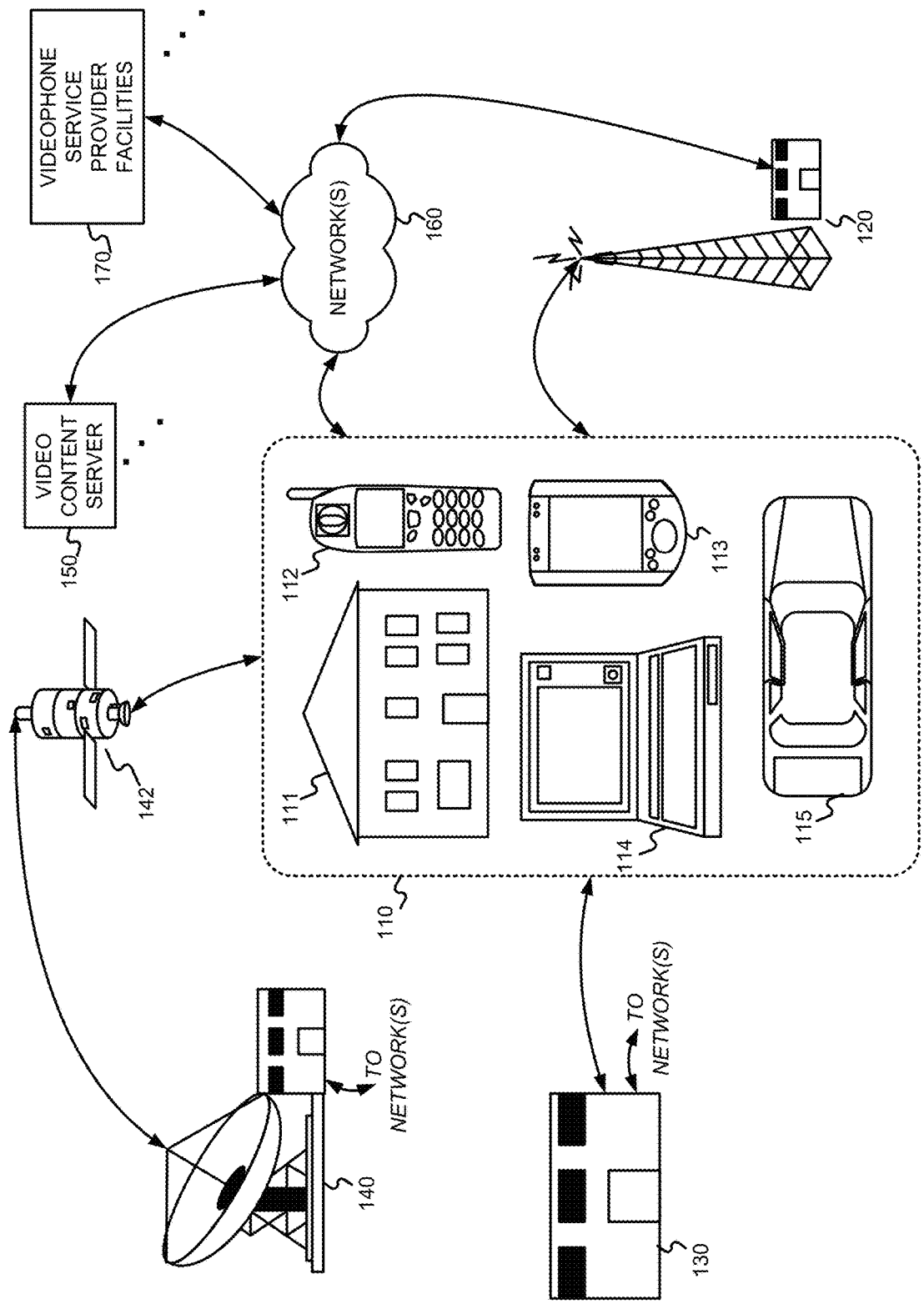
FIG. 1 is a diagram illustrating various ways video content can be delivered and received.

The present invention may involve novel methods, apparatus, message formats, and/or data structures for improving the serving of video advertisements with documents, such as documents including video content for example. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. Also, as used herein, the article "a" is intended to include one or more items. Where only one item is intended, the term "one" or similar language is used. In the following, "information" may refer to the actual information, or a pointer to, identifier of, or location of such information. No element, act or instruction used in the description should be construed as critical or essential to the present invention unless explicitly described as such. Thus, the present invention is not intended to be limited to the embodiments shown and the inventor regards his invention to include any patentable subject matter described.

In the following definitions of terms that may be used in the specification are provided in § 4.1. Then, environments in which, or with which, the present invention may operate are described in § 4.2. Exemplary embodiments of the present invention are described in § 4.3. Thereafter, specific examples illustrating the utility of exemplary embodiments of the present invention are provided in § 4.4. Finally, some conclusions regarding the present invention are set forth in § 4.5.

§ 4.1 DEFINITIONS

Online ads, such as those used in the exemplary systems described below with reference to FIGS. 2 and 3, or any other system, may have various intrinsic features. Such features may be specified by an application and/or an advertiser. These features are referred to as "ad features" below. For example, in the case of a text ad, ad features may include a title line, ad text, and an embedded link. In the case of an image ad, ad features may include images, executable code, and an embedded link. In the case of a video ad, ad features may include video content and, most likely, audio content. The ad features may also include executable code (e.g., encoded as tones, pixels, etc., provided in non-video packets of a video stream, etc.). Depending on the type of online ad, ad features may include one or more of the following: text, a link, an audio file, a video file, an image file, executable code, embedded information, etc. In devices that can render more than one type of media (devices that have different outputs), some ad features may pertain to one type of media rendered to the user over one output, while other ad features may pertain to another type of media rendered to the user over another output. For example, if a mobile telephone includes a speaker, a display and telephony means, a video ad to be rendered on such a telephone can have one or more of an audio-video component and executable code for dialing an encoded telephone number. Naturally, other types of ad features are possible.

When an online ad is served, one or more parameters may be used to describe how, when, and/or where the ad was served. These parameters are referred to as "serving parameters" below. Serving parameters may include, for example, one or more of the following: features of (including information on) a document on which, or with which, the ad was served, a search query or search results associated with the serving of the ad, a user characteristic (e.g., their geographic location, the language used by the user, the type of browser used, previous page views, previous behavior, user account, any Web cookies used by the system, user device characteristics, etc.), a host or affiliate site (e.g., America Online, Google, Yahoo) that initiated the request, an absolute position of the ad on the page on which it was served, an ad spot in which the ad was served (e.g., a position (spatial or temporal) of the ad relative to other ads served), an absolute size of the ad, a size of the ad relative to other ads, an absolute and/or relative resolution of the ad, an absolute and/or relative video frame rate of the ad, an absolute volume of the ad, a volume of the ad relative to other ads, an absolute temporal length of the ad, a relative temporal length of the ad, a color of the ad, a number of other ads served, types of other ads served, time of day served, time of week served, time of year served, etc. Naturally, there are other serving parameters that may be used in the context of the invention.

Although serving parameters may be extrinsic to ad features, they may be associated with an ad as serving conditions or constraints. When used as serving conditions or constraints, such serving parameters are referred to simply as "serving constraints" (or "targeting criteria"). For example, in some systems, an advertiser may be able to target the serving of its ad by specifying that it is only to be served on weekdays, no lower than a certain position, only to users in a certain location, etc. As another example, in some systems, an advertiser may specify that its ad is to be served only if a page or search query includes certain keywords or phrases. As yet another example, in some systems, an advertiser may specify that its ad is to be served only if a document, on which, or with which, the ad is to be served, includes certain topics or concepts, or falls under a particular cluster or clusters, or some other classification or classifications (e.g., verticals). In some systems, an advertiser may specify that its ad is to be served only to (or is not to be served to) user devices having certain characteristics. Finally, in some systems, an ad might be targeted so that it is served in response to a request sourced from a particular location, or in response to a request concerning a particular location.

"Ad information" may include any combination of ad features, ad serving constraints, information derivable from ad features or ad serving constraints (referred to as "ad derived information"), and/or information related to the ad (referred to as "ad related information"), as well as an extension of such information (e.g., information derived from ad related information).

The ratio of the number of selections (e.g., clickthroughs, dial-throughs, etc.) of an ad to the number of impressions of the ad (i.e., the number of times an ad is rendered) is defined as the "selection rate" (or "clickthrough rate" or "CTR") of the ad.

A "conversion" is said to occur when a user consummates a transaction related to a previously served ad. What constitutes a conversion may vary from case to case and can be determined in a variety of ways. For example, it may be the case that a conversion occurs when a user clicks on an ad, is referred to the advertiser's Web page, and consummates a purchase there before leaving that Web page. Alternatively, a conversion may be defined as a user being shown an ad, and making a purchase on the advertiser's Web page within a predetermined time (e.g., seven days). In yet another alternative, a conversion may be defined by an advertiser to be any measurable/observable user action such as, for example, downloading a white paper, navigating to at least a given depth of a Website, viewing at least a certain number of Web pages, spending at least a predetermined amount of time on a Website or Web page, registering on a Website, dialing a telephone number, sending a product or service inquiry, etc. Often, if user actions don't indicate a consummated purchase, they may indicate a sales lead, although user actions constituting a conversion are not limited to this. Indeed, many other definitions of what constitutes a conversion are possible.

The ratio of the number of conversions to the number of impressions of the ad (i.e., the number of times an ad is rendered) and the ratio of the number of conversions to the number of selections (or the number of some other earlier event) are both referred to as the "conversion rate" or "CR." The type of conversion rate will be apparent from the context in which it is used. If a conversion is defined to be able to occur within a predetermined time since the serving of an ad, one possible definition of the conversion rate might only consider ads that have been served more than the predetermined time in the past.

A "property" is something on which ads can be presented. A property may include online content (e.g., a Website, a video program, a Webcast, a podcast, online games, etc.), offline content (e.g., a newspaper, a magazine, a theatrical production, a concert, a sports event, a television broadcast, etc.), and/or offline objects (e.g., a billboard, a stadium score board, an outfield wall, the side of truck trailer, etc.). Properties with content (e.g., magazines, newspapers, Websites, email messages, television programs, etc.) may be referred to as "media properties." Although properties may themselves be offline, pertinent information about a property (e.g., attribute(s), topic(s), concept(s), category(ies), keyword(s), relevancy information, type(s) of ads supported, etc.) may be available online. For example, an outdoor jazz music festival may have entered the topics "music" and "jazz", the location of the concerts, the time of the concerts, artists scheduled to appear at the festival, and types of available ad spots (e.g., spots in a printed program, spots on a stage, spots on seat backs, audio announcements of sponsors, on site video displays, etc.). A "video property" is a property that can be seen. A video property may include other components (e.g., audio), but not necessarily.

A "document" is to be broadly interpreted to include any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, sound, conversations, etc.) and some indication of the meaning of that content (for example, e-mail fields and associated data, HTML tags and associated data, embedded program title and related information, etc.) Ad spots in the document may be defined by embedded information or instructions. In the context of the Internet, a common document is a Web page. Web pages often include content and may include embedded information (such as meta information, hyperlinks, etc.) and/or embedded instructions (such as JavaScript, etc.). In many cases, a document has an addressable storage location and can therefore be uniquely identified by this addressable location. A universal resource locator (URL) is an address used to access information on the Internet.

A "Web document" includes any document published on the Web. Examples of Web documents include, for example, a Website, a Web page, a Webcast, etc.

A "video document" is a document that can be seen when played or decoded. A "video document" may include video content regardless of whether or not that content is ultimately stored on a tangible medium. A video document may include, for example, a live or recorded television program, a live or recorded theatrical or dramatic work, a music video, a televised event (e.g., a sports event, a political event, a news event, etc.), video-voice mail, etc. Each of different forms or formats of the same video content (e.g., original, compressed, packetized, streamed, etc.) may be considered to be a video document (e.g., the same video document, or different video documents). Embodiments consistent with the present invention may work with various video and "container" file formats such as, for example, one or more of Macromedia's Flash Video (FLV), Microsoft's Advanced Streaming format (ASF), Windows Media Audio (WMA), Windows Media file with Audio/Video (WMV), Audio Video Interleave (AVI), DivX™, Intel Video Technology (IVF), Quick-Time Movie File Extension (MOV), MPEG, Real Media, RealAudio, RealPlayer, Real Video, Vivo Video (VIV), OGG, Matroska, 3gp, NUT, MXF, ratDVD, svi, etc. Embodiments consistent with the present invention may work with other video file formats.

"Document information" may include any information included in the document, information derivable from information included in the document (referred to as "document derived information"), and/or information related to the document (referred to as "document related information"), as well as an extensions of such information (e.g., information derived from related information). An example of document derived information is a classification based on textual transcript, or audio/video content of a document. Examples of document related information include document information from other documents with links to the instant document, as well as document information from other documents to which the instant document links.

Content from a document may be rendered on a "content rendering application or device". Examples of content rendering applications include an Internet browser (e.g., Explorer, Netscape, Opera, Firefox, etc.), a media player (e.g., an MP3 player, a streaming media file player from Microsoft Corporation of Redmond, Wash., or from Real-Networks, Inc., of Seattle, Wash., Apple Computer Inc. of Cupertino, Calif., Macromedia Inc. of San Francisco, Calif., etc.), a viewer (e.g., an Abobe Acrobat pdf reader), etc. Examples of content rendering devices include video games (e.g., Sony Play Station II and PSP, Microsoft X-Box, Nintendo GameCube, etc.), mobile telephones, televisions, radios, set-top boxes (STBs), etc.

A "content owner" is a person or entity that has some property right in the content of a media property (e.g., document). A content owner may be an author of the content. In addition, or alternatively, a content owner may have rights to reproduce the content, rights to prepare derivative works of the content, rights to display or perform the content publicly, and/or other proscribed rights in the content. Although a content server might be a content owner in the content of the documents it serves, this is not necessary. A "Web publisher" is an example of a content owner.

"User information" may include user behavior information and/or user profile information.

"E-mail information" may include any information included in an e-mail (also referred to as "internal e-mail information"), information derivable from information included in the e-mail and/or information related to the e-mail, as well as extensions of such information (e.g., information derived from related information). An example of information derived from e-mail information is information extracted or otherwise derived from search results returned in response to a search query composed of terms extracted from an e-mail subject line. Examples of information related to e-mail information include e-mail information about one or more other e-mails sent by the same sender of a given e-mail, or user information about an e-mail recipient. Information derived from or related to e-mail information may be referred to as "external e-mail information."

§ 4.2 EXEMPLARY ADVERTISING ENVIRONMENTS IN WHICH, OR WITH WHICH, EMBODIMENTS CONSISTENT WITH THE PRESENT INVENTION MAY OPERATE

FIG. 1 is a diagram illustrating various ways video content can be delivered and received. Video content can be consumed at various client locations, using various devices 110 such as, for example, a customer premises 111 (such as a home residence or business which may include computers, video players, televisions, etc.), a mobile telephone with video functionality 112, a video player 113, a laptop computer 114, a car video player 115, etc. Video content may be transmitted from various sources such as, for example, terrestrial television (or data) transmission stations 120, cable television (or data) transmission stations 130, satellite television (or data) transmission stations 140, via satellites 142, and video content servers (e.g., Webcasting servers, podcasting servers, video streaming servers, video download Websites, etc.) 150, via network(s) 160 such as the Internet for example, and video phone service providers 170 via network(s) 160 such as the Public Switched Telephone Network ("PSTN") and the Internet for example. Although not all connections are shown, one or more of the transmission stations 120, 130 and 140 may be coupled with the network(s) 160.

FIG. 2 is a diagram of an advertising environment. The environment may include an ad entry, maintenance and delivery system (simply referred to as an ad server) 220. Advertisers 210 may directly, or indirectly, enter, maintain, and track ad information in the system 220. The ads may be in the form of graphical ads such as so-called banner ads, text only ads, image ads, audio ads, video ads, ads combining one of more of any of such components, etc. The ads may also include embedded information, such as a link, a telephone number, an e-mail address, and/or machine executable instructions. Ad consumers 230 may submit requests for ads to, accept ads responsive to their request from, and provide usage information to, the system 220. An entity other than an ad consumer 230 may initiate a request for ads. Although not shown, other entities may provide usage information (e.g., whether or not a conversion or selection related to the ad occurred) to the system 220. This usage information may include measured or observed user behavior related to ads that have been served.

The ad server 220 may be similar to, or have some similar features as, the one described in the '900 application. An advertising program may include information concerning accounts, campaigns, creatives, targeting, etc. The term "account" relates to information for a given advertiser (e.g., a unique e-mail address, a password, billing information, etc.). A "campaign" or "ad campaign" refers to one or more groups of one or more advertisements, and may include a start date, an end date, budget information, geo-targeting information, syndication information, etc. For example, Honda may have one advertising campaign for its automotive line, and a separate advertising campaign for its motorcycle line. The campaign for its automotive line may have one or more ad groups, each containing one or more ads. Each ad group may include targeting information (e.g., a set of keywords, a set of one or more topics, etc.), and price information (e.g., cost, average cost, or maximum cost (per impression, per selection, per conversion, etc.)). Therefore, a single cost, a single maximum cost, and/or a single average cost may be associated with one or more keywords, and/or topics. As stated, each ad group may have one or more ads or "creatives" (That is, ad content that is ultimately rendered to an end user.). Each ad may also include a link to a URL (e.g., a landing Web page, such as the home page of an advertiser, or a Web page associated with a particular product or server). Alternatively, or in addition, each ad may include embedded information for initiating a telephone call (e.g., to facilitate providing product or service information, or to facilitate completing an order). Alternatively, or in addition, each ad may include information for initiating a message (e.g., facilitate providing product or service information, or to facilitate completing an order). Naturally, the ad information may include more or less information, and may be organized in a number of different ways.

FIG. 3 illustrates an environment 300 in which the present invention may be used. A user device (also referred to as a "client" or "client device") 350 may include a media player (e.g., an MP3 player, a streaming audio player, a streaming video player, a television, a computer, a mobile device, etc.) a browser facility (such as the Explorer browser from Microsoft, the Opera Web Browser from Opera Software of Norway, the Navigator browser from AOL/Time Warner, the Firefox browser from Mozilla, etc.), an e-mail facility (e.g., Outlook from Microsoft), telephony means, etc. A search engine 320 may permit user devices 350 to search collections of documents (e.g., Web pages). A content server 310 may permit user devices 350 to access documents, such as video documents (such as videos hosted and available at Google Video) for example. An e-mail server (such as GMail from Google, Hotmail from Microsoft Network, Yahoo Mail, etc.) 340 may be used to provide e-mail functionality to user devices 350. The e-mails may include video attachments and/or video messages. An ad server 310 may be used to serve ads to user devices 350. The ads may be served in association with search results provided by the search engine 320. However, content-relevant ads may be served in association with content provided by the content server 330, e-mail supported by the e-mail server (or voice-mail supported by a voice-mail server) 340 and/or user device e-mail facilities, video content served by video server 360 and/or played by user device video player facilities. Video communications service provider facilities 370 may be used to provide video-phone or video-walkie-talkie services over the network(s) 360. For example, some companies provide voice over Internet Protocol ("VoIP") services, As discussed in the '900 application, ads may be targeted to documents served by content servers. Thus, one example of an ad consumer 230 is a general content server 330 that receives requests for documents (e.g., articles, discussion threads, music, audio, video (e.g., televisions programs, music videos, video mail, a streamed video file, etc.), graphics, search results, Web page listings, etc.), and retrieves the requested document in response to, or otherwise services, the request. The content server may broadcast content as well (e.g., not necessarily responsive to a request). The content server may submit a request for ads to the ad server 220/310. Such an ad request may include ad spot information (e.g., a number of ads desired, a duration, type of ads eligible, etc.). The ad request may also include document request information. This information may include the document itself (e.g., a page, a video file, a segment of a video stream, etc.), a category or topic corresponding to the content of the document or the document request (e.g., arts, business, computers, arts-movies, arts-music, etc.), part or all of the document request, content age, content type (e.g., text, graphics, video, audio, mixed media, etc.), geo-location information, document information, etc.

The content server 330 may combine the (e.g., requested) document with one or more of the advertisements provided by the ad server 220/310. This combined information including the document content and advertisement(s) is then forwarded towards the end user device 350 that requested the document or that configured itself to receive the document, for presentation to the user. Finally, the content server 330 may transmit information about the ads and how, when, and/or where the ads are to be rendered (e.g., ad spot, position, selection or not, impression time, impression date, size, temporal length, volume, conversion or not, etc.) back to the ad server 220/310. Alternatively, or in addition, such information may be provided back to the ad server 220/310 by some other means.

The offline content provider 332 may provide information about ad spots in an upcoming publication, and perhaps information about the publication (e.g., the content or topics or concepts of the content), to the ad server 310. In response, the ad server 310 may provide a set of ads relevant the content of the publication for at least some of the ad spots. Examples of offline content providers 332 include, for example, magazine publishers, newspaper publishers, book publishers, offline broadcasts, offline music publishers, offline video game publishers, a theatrical production, a concert, a sports event, etc.

Owners of the offline ad spot properties 334 may provide information about ad spots in their offline property (e.g., a JumboTron™, ProStar™, DiamondVision™, AstroVision™, or SmartVision™ video ad for an NBA game in San Antonio, Tex.). In response, the ad sever may provide a set of ads relevant to the property for at least some of the ad spots. Examples of offline properties 334 include, for example, a billboard, a stadium score board, and outfield wall, the side of truck trailer, etc.

Another example of an ad consumer 230 is the search engine 320. A search engine 320 may receive queries for search results. In response, the search engine may retrieve relevant search results (e.g., from an index of Web pages). An exemplary search engine is described in the article S. Brin and L. Page, "The Anatomy of a Large-Scale Hypertextual Search Engine," *Seventh International World Wide Web Conference*, Brisbane, Australia and in U.S. Pat. No. 6,285,999 (both incorporated herein, in their entirety, by reference). Such search results may include, for example, lists of Web page titles, snippets of text extracted from those Web pages, and hypertext links to those Web pages, and may be grouped into a predetermined number of (e.g., ten) search results.

The search engine 320 may submit a request for ads to the ad server 220/310. The request may include a number of ads desired. This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as geolocation information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., Web pages), full text of identified documents, topics of identified documents, feature vectors of identified documents, etc.

The search engine 320 may combine the search results with one or more of the advertisements provided by the ad server 220/310. This combined information including the search results and advertisement(s) is then forwarded towards the user that submitted the search, for presentation to the user. Preferably, the search results are maintained as distinct from the ads, so as not to confuse the user between paid advertisements and presumably neutral search results.

Finally, the search engine 320 may transmit information about the ad and when, where, and/or how the ad was to be rendered (e.g., position, selection or not, impression time, impression date, size, conversion or not, etc.) back to the ad server 220/310. Alternatively, or in addition, such information may be provided back to the ad server 220/310 by some other means.

The e-mail server 340 may be thought of, generally, as a content server in which a document served is simply an e-mail. Further, e-mail applications (such as Microsoft Outlook for example) may be used to send and/or receive e-mail. Therefore, an e-mail server 340 or application may be thought of as an ad consumer 230. Thus, e-mails may be thought of as documents, and targeted ads may be served in association with such documents. For example, one or more ads may be served in, under, over, or otherwise in association with an e-mail. Although not shown, a video-voice-mail server may be thought of, generally, as a content server.

The video server 360 may be thought of, generally, as a content server in which a document served is simply a video document, such as a video stream or a video file for example. Further, video player applications (such as RealNetwork's Real media player, Microsoft's Media Player, Apple's Quicktime player, Macromedia's Flash player, etc.) may be used to render video files. Therefore, a video server 360 or application may be thought of as an ad consumer 240. Thus, ads may be served in association with video documents. For example, one or more ads may be served before, during, or after a music video, program, program segment, etc. Alternatively, one or more ads may be served in association with a music video, program, program segment, etc.

Finally, the video communications service provider facilities 370 may also consume ads, such as ads relevant to a topic or topics of a videophone conversation.

Although the foregoing examples described servers as (i) requesting ads, and (ii) combining them with content, one or both of these operations may be performed by a client device (such as an end user computer for example).

§ 4.3 EXEMPLARY EMBODIMENTS

Figure 4:
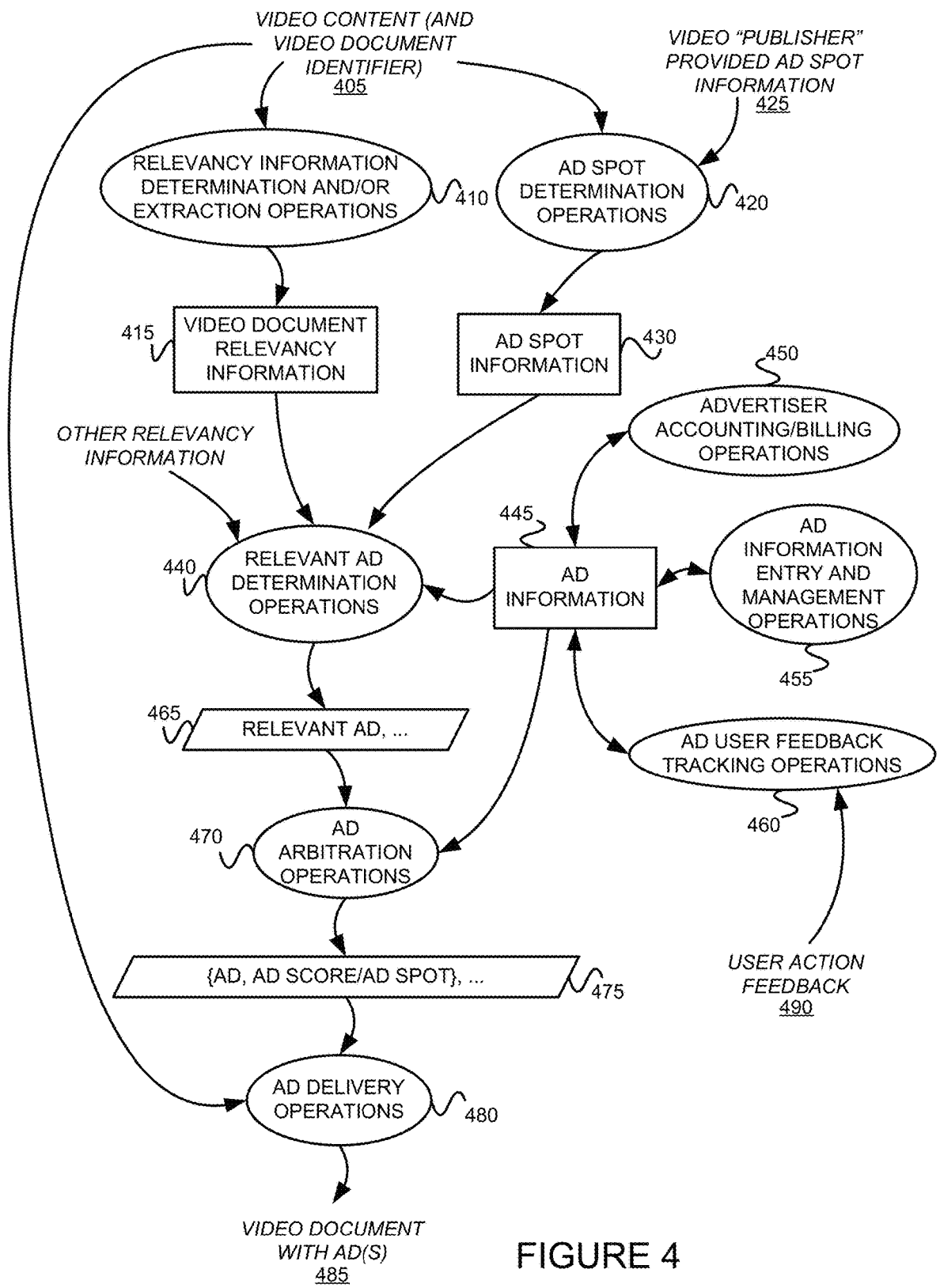
FIG. 4 is a bubble diagram of exemplary operations that may be performed in a manner consistent with the present invention, as well as information that may be used and/or generated by such operations.

FIG. 4 is a bubble diagram of exemplary operations that may be performed in a manner consistent with the present invention, as well as information that may be used and/or generated by such operations. The operations may include one or more of relevancy information determination and/or extraction operations 410, ad spot determination operations 420, relevant ad determination operations 440, advertiser accounting/billing operations 450, ad information entry and management operations 455, ad user feedback tracking operations 460, ad arbitration operations 470 and ad delivery (e.g., insertion) operations 480. The information may include video document relevancy information 415, ad spot information 430, and ad information 445.

Relevancy information determination and/or extraction operations 410 may accept video content (and perhaps a video document identifier) 405 and generate video document relevancy information 415. Exemplary methods for performing such relevancy information determination and/or extraction operations 410 are described below with reference to FIG. 8. Exemplary data structures for storing such video document relevancy information 415 are described below with reference to FIG. 5.

Ad spot determination operations 420 may accept video content 405 and/or video publisher provided ad spot information 425 and may generate ad spot information 430. Exemplary methods for performing such ad spot determination operations 420 are described below with reference to FIG. 9. Exemplary data structures for storing such ad spot information 430 are described below with reference to FIG. 6.

Relevant ad determination operations 440 may use video document relevancy information 415, ad spot information 430, and ad information 445 (and perhaps other relevancy information) to generate one or more relevant ads 465. Exemplary methods for performing relevant ad determination operations 440 are described below with reference to FIG. 10. Exemplary data structures for storing ad information are described below with reference to FIG. 7.

Ad arbitration operations 470 may use ad information 445 to score the relevant ads 465 and to generate associations 475 of relevant ads to ad spots. Exemplary methods for performing ad arbitration operations 470 are described below with reference to FIG. 11.

Ad delivery operations 480 may accept ad, ad spot associations 475 and serve the ads in association with (e.g., insert the ad into) video content 405. For example, a mixer may be used to combine a video ad with an appropriate portion (e.g., an ad spot) of a video document. Such insertion may occur, for example, at the video content server, and/or at the client device.

Advertiser accounting/billing operations 450, ad information entry and management operations 455 and ad user feedback tracking operations 460 may be performed using techniques described in the '427 application and in the '900 application, and/or may use techniques known to those skilled in the art.

§ 4.3.1 Exemplary Methods and Data Structures

Figure 8:
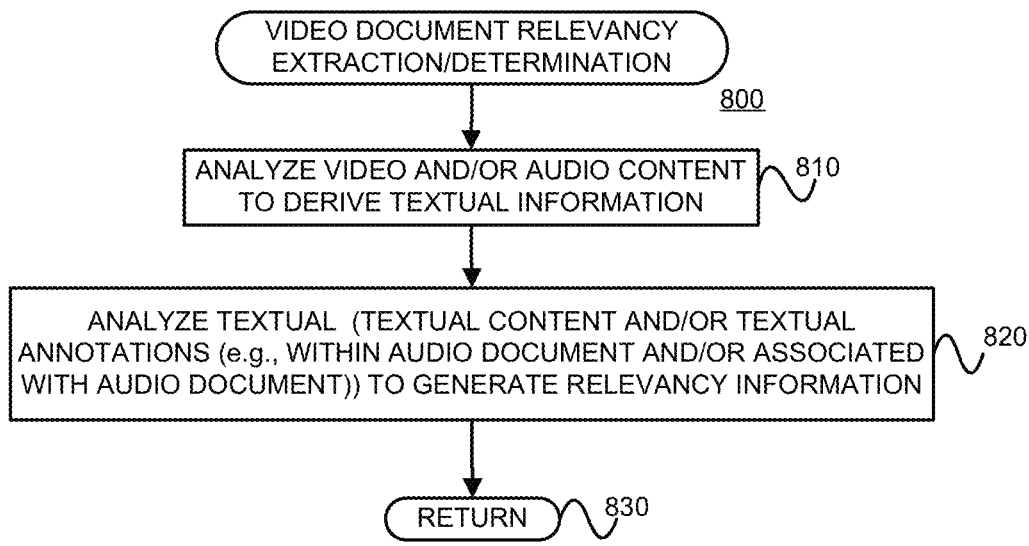
FIG. 8 is a flow diagram of an exemplary method for extracting and/or determining relevancy information for a video document in a manner consistent with the present invention.

FIG. 8 is a flow diagram of an exemplary method 800 for extracting and/or determining relevancy information for a video document (or a segment thereof) in a manner consistent with the present invention. Video and/or audio content from the video document may be analyzed to derive textual information. (Block 810) Textual information may then be analyzed to generate relevancy information (Block 820) before the method 800 is left (Node 830).

Referring back to block 810, textual information may be derived from audio information in an audio-video document by performing speech recognition on various audio feeds, producing hypothesized words annotated with confidence scores, or producing a lattice which contains many hypotheses (therefore less likely to miss a keyword). Converting audio to text can be achieved by known automatic speech recognition techniques. (See, e.g., Kai-Fu Lee, "Automatic Speech Recognition—The Development of the SPHINX System," Kluwer Academic Publishers, Norwell, Mass., 1989, incorporated herein, in its entirety, by reference.)

Once a (e.g., rough) transcription is available, relevance information (e.g., terms, weighted terms, concepts, weighted concepts, categories (e.g., vertical categories), weighted categories, etc.) may be derived from the transcription and used to select relevant ads. Even if current speech recognition technology is not accurate enough for certain end user applications, it may be good enough to provide a rough transcription, from which a gist (or topic(s)) of an audio document can be determined.

Alternatively, or in addition, the content owner may provide Meta data about its video content. Such Meta data may include, for example, one or more of a title, a description, a transcript, Tribune Meta data, a recommended viewing demographic, etc.

Referring back to block 820, the textual information may be analyzed to generate relevancy information using various techniques, such as those described in the '427 and '900 applications, and those described in U.S. patent application Ser. No. 11/112,716 (incorporated herein, in its entirety, by reference and referred to as "the '716 application"), filed on Apr. 22, 2005, titled "CATEGORIZING OBJECTS, SUCH AS DOCUMENTS AND/OR CLUSTERS, WITH RESPECT TO A TAXONOMY AND DATA STRUCTURES DERIVED FROM SUCH CATEGORIZATION" and listing David Gehrking, Ching Law and Andrew Maxwell as inventors, etc. Relevancy information may include, for example, one or more of term vectors, weighted term vectors, clusters, weighted clusters, categories (e.g., vertical categories), weighted categories, etc. The clusters may be probabilistic hierarchical inferential learner (referred to as "PHIL") clusters, such as those described in U.S. Provisional Application Ser. No. 60/416,144 (referred to as "the '144 provisional" and incorporated herein, in its entirety, by reference), titled "Methods and Apparatus for Probabilistic Hierarchical Inferential Learner," filed on Oct. 3, 2002, and U.S. patent application Ser. No. 10/676,571 (referred to as "the '571 application" and incorporated herein, in its entirety, by reference), titled "Methods and Apparatus for Characterizing Documents Based on Cluster Related Words," filed on Sep. 30, 2003 and listing Georges Harik and Noam Shazeer as inventors. Such PHIL clusters may be generated, for example, using the techniques described in the '144 provisional and the '571 application. The source of the textual information may be that derived from an analysis of the audio content, such as in block 810, and/or Meta data provided by the content owner.

Alternatively, or in addition, the video publisher (or some other entity) may have annotated the video document with textual information or encoded textual information in the video content (e.g., in packets, portions of packets, portions of streams, headers, footers, etc.). For example, a video broadcaster may provide in their broadcast, a station identifier, a program identifier, location information, etc. In this case, genre and location information might be derived from the video broadcast. Such relevance information may be used to target relevant ads. As another example, video disks may encode information about a movie such as, for example, title, actors and actresses, directors, scenes, etc. Such information may be used to lookup a textual transcript of the movie. As yet another example, a request for a video may have an associated IP address from which location information can be derived. As yet another example, a program may be annotated with keywords, topics, etc. Such relevance information may be used to target relevant ads.

Alternatively, or in addition, the audio information in an audio-video document may be analyzed to generate other types of relevancy information. For example, the gender (e.g., due to pitch, tone, etc,), nationality, and/or ethnicity (e.g., due to language, accent, etc.) of a speaker in voice audio of audio-visual content (e.g., a participant in a conversation) may be determined from audio analysis. (See, e.g., M. A. Siegler, U. Jain, B. Raj, and R. M. Stern, "Automatic Segmentation, Classification and Clustering of Broadcast News Audio," *Proceedings of the Ninth Spoken Language Systems Technology Workshop*, Harriman, N.Y., 1996; and Greg Sanders, "Metadata Extraction for EARS," *Rich Transcription Workshop*, Vienna, Va., 2002 (both incorporated herein, in their entirety, by reference).)

FIG. 5 illustrates an exemplary data structure 500 for storing video document relevancy information in a manner consistent with the present invention. As shown, the data structure 500 may include a plurality of entries corresponding to a plurality of rows. Each entry may include a video document identifier 510 and relevancy information 520. The relevancy information may include one or more of terms, weighted terms, concepts, weighted concepts, clusters, weighted clusters, vertical categories, weighted vertical categories, location information, user information, etc.

Figure 9:
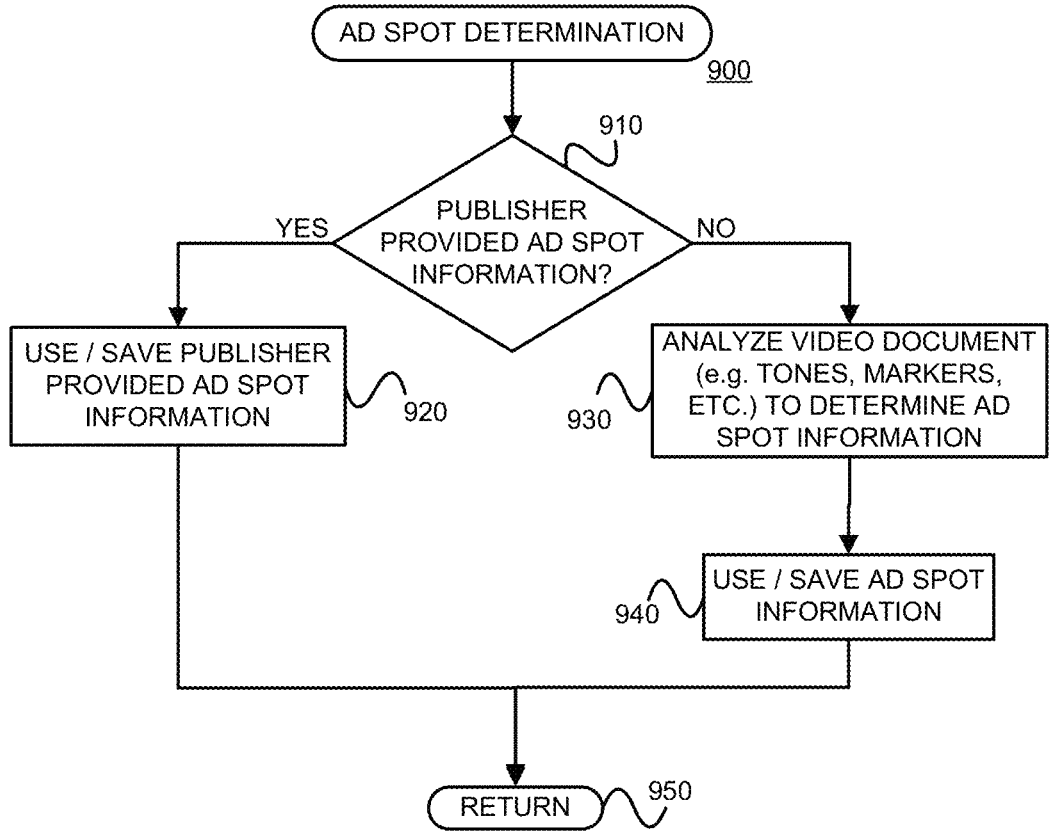
FIG. 9 is a flow diagram of an exemplary method for determining ad spots in a manner consistent with the present invention.

FIG. 9 is a flow diagram of an exemplary method 900 for determining ad spots in a manner consistent with the present invention. It may be determined whether or not a video document publisher provided ad spot information. (Decision block 910) That is, ad spot information may be associated with a document, but provided separately from (i.e., not included in) the document. If so, the provided ad spot information may be used and/or saved for later use (Block 920) before the method 900 is left (Node 950). Referring back to decision block 910, if the publisher or some other entity did not provide ad spot information, the video document may be analyzed to determine ad spot information (Block 930). The determined ad spot information may then be used and/or saved for later use (Block 940) before the method 900 is left (Node 950).

Referring back to block 920, the video publisher or some other entity may provide absolute or relative times when ad spots are to start. The publisher or some other entity may further provide duration or times when the ad spots are to stop. For example, a video publisher may specify that a first ad spot is to start at 8:20 AM EST and last two (2) minutes, a second ad spot is to start at 8:40 AM EST and last four (4) minutes and a third ad spot is to start at 8:52 and last six (6) minutes. As another example, a video publisher may specify that a three (3) minute ad spot is to occur every 30 minutes starting at 8:00 AM EST. As yet another example, a video publisher may specify that a two (2) minute ad spot is to occur every 15 minutes after the start of a video program, and a four (4) minute ad spot is to occur 50 minutes into the video program.

Referring back to block 930, the video document itself may be analyzed to determine ad spot information. That is, ad spot information may be carried in the video document itself. For example, markers (e.g., audio tones) embedded within an audio-video program may encode that an X second ad spot is to start in Y seconds. As another example, data carried in packets of a video stream or a container file may specify ad spot information.

FIG. 6 illustrates an exemplary data structure 600 for storing ad spot information in a manner consistent with the present invention. As shown, the data structure 600 may include a plurality of entries corresponding to a plurality of rows. Each entry may include an ad spot identifier 610 and ad spot information 620. The ad spot identifier 610 may include a video document identifier to which the ad spot belongs. The ad spot information 620 may include information related to when the ad spot is to occur (e.g., start date and time and duration, start date and time and end date and time, time from reference time to start and duration, times from reference time to start and end, etc.). In addition, the ad spot information may include policy information such as filters. One class of filters may include those that filter ads based on their content of the ad. For example, a video program which concerns healthy living might filter out ads for cigarettes. As another example, a video program for kids might filter out ads which may include obscene or suggestive language. As yet another example, a video program dealing with gambling addiction may filter out ads for casinos. Another class of filters may include those that filter based on the source of the ad. For example, an Internet television station might block ads for programs on a competing Internet television station. Other techniques for implementing advertising policies, such as those described in U.S. patent application Ser. No. 10/656,917 (incorporated herein, in its entirety, by reference and referred to as "the '917 application"), titled "IDENTIFYING AND/OR BLOCKING ADS SUCH AS DOCUMENT-SPECIFIC COMPETITIVE ADS", filed on Sep. 5, 2003 and listing Brian Axe, Rama Ranganath and Narayanan Shivakumar as inventors; and U.S. patent application Ser. No. 10/937,460 (incorporated herein, in its entirety, by reference and referred to as "the '460 application"), titled "FACILITATING THE BLOCKING OF AD SERVING", filed on Sep. 9, 2004 and listing Vibhu Mittal, Peter Norvig and Mehran Sahami as inventors, for example, may be used.

The ad spot information 620 may also include information such as, for example, one or more of the source location of the video program including the ad spot, the destination location of the client device receiving the video program including the ad spot, a client device type receiving the video program including the ad spot, etc.

Although some of the exemplary ad spots described above had a definite length, ads needn't have a fixed or determined length. For example, in the context of a media player with a display screen, a text ad may be displayed (e.g., for a time period defined by the advertiser, for a period of time defined by the video publisher, until the next ad spot, etc.) without interrupting the video program.

Figure 10:
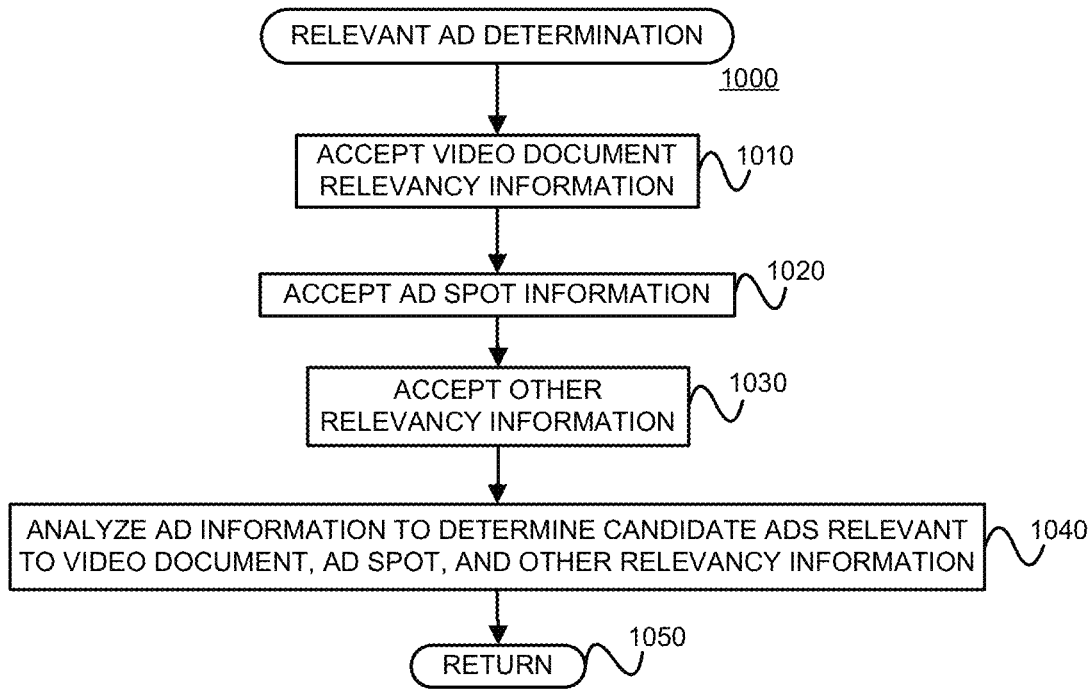
FIG. 10 is a flow diagram of an exemplary method for determining ads relevant to ad spots in a video document in a manner consistent with the present invention.

FIG. 10 is a flow diagram of an exemplary method 1000 for determining ads relevant to ad spots in a video document in a manner consistent with the present invention. As shown, video document relevancy information, such as that stored in the data structure 500 of FIG. 5 for example, may be accepted. (Block 1010) Alternatively, or in addition, ad spot information, such as video document source location, client device location, client device type, time, date, etc. may be accepted. (Block 1020) Alternatively, or in addition, other relevancy information such as, for example, one or more of end user information (e.g., past behavior, demographics, etc.), source information (e.g., sports station, classical music and theater station, news station, etc.), etc. may be accepted. (Block 1030) Ad information may then be analyzed to determine candidate ads relevant to the video document, ad spot, and/or other relevancy information. (Block 1040) For example, techniques such as those described in the '427 and '900 patent applications may be used. The method 1000 is then left. (Node 1050)

Referring back to block 1040, the ad information may include targeting information provided by the advertiser. Alternatively, or in addition, the ad information may include targeting information derived from the ad creative and/or information associated with the ad such as an ad landing page. Such targeting information may include one or more of keywords, vertical categories, genres, concepts, video program identifiers, video server identifiers, user identifiers, languages, stations, video servers, user types, locations, times, dates, client devices, other serving constraints, etc.

Figure 11:
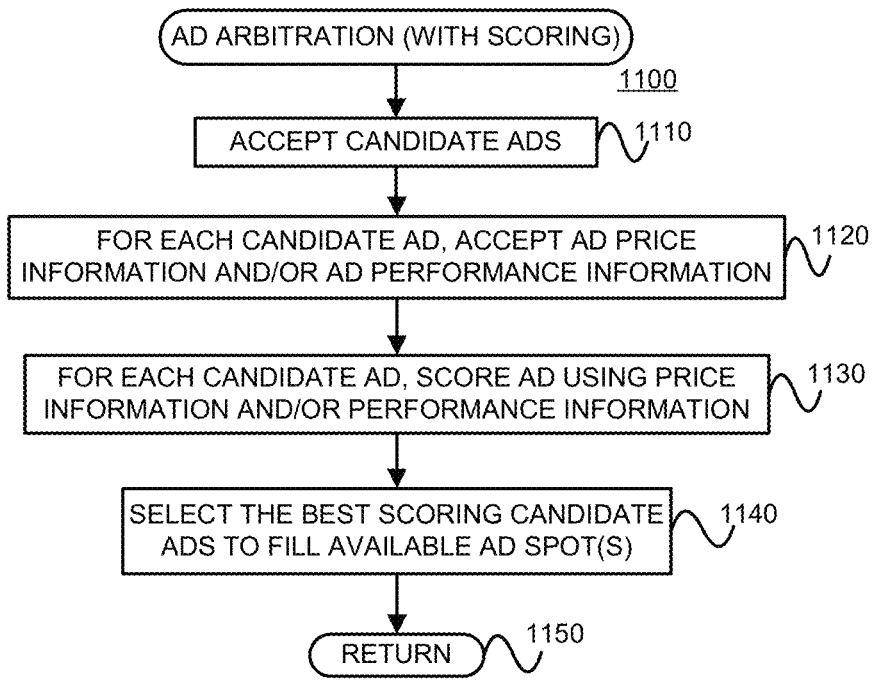
FIG. 11 is a flow diagram of an exemplary method for arbitrating relevant ads competing for video document ad spots in a manner consistent with the present invention.

FIG. 11 is a flow diagram of an exemplary method 1100 for arbitrating relevant ads competing for ad spots in a video document in a manner consistent with the present invention. Candidate ads are accepted. (Block 1110) For each candidate ad, price information and/or performance information may be accepted (Block 1120), and each of the candidate ads may be scored using the price information and/or performance information (Block 1130). Alternatively, or in addition, the score may consider a degree of relevancy of the ad to the video document (or segment thereof). Finally, the best scoring candidate ads are selected to fill available ad spots (Block 1140) before the method 1100 is left (Node 1150).

Referring back to block 1120, the price information may be, for example, a price per impression, a maximum price per impression, a price per selection, a maximum price per selection, a price per conversion, a maximum price per conversion, etc. The performance information may be, for example, a selection rate, a conversion rate, end user ratings, etc.

Referring back to block 1130, the candidate ads may be scored using, for example, techniques described in U.S. patent application Ser. No. 10/112,656 (incorporated herewith and referred to as "the '656 application"), titled "METHODS AND APPARATUS FOR ORDERING ADVERTISEMENTS BASED ON PERFORMANCE INFORMATION", filed on Mar. 29, 2002 and listing Georges R. Harik, Lawrence E. Page, Jane Manning and Salar Arta Kamangar as inventors; U.S. patent application Ser. No. 10/112,654 (incorporated herein, in its entirety, by reference and referred to as "the '654 application"), titled "METHODS AND APPARATUS FOR ORDERING ADVERTISEMENTS BASED ON PERFORMANCE INFORMATION AND PRICE INFORMATION", filed on Mar. 29, 2002 and listing Salar Arta Kamangar, Ross Koningstein and Eric Veach as inventors; U.S. patent application Ser. No. 10/452,791 (incorporated herein, in its entirety, by reference and referred to as "the '791 application"), titled "SERVING ADVERTISEMENTS USING USER REQUEST INFORMATION AND USER INFORMATION", filed on Jun. 2, 2003 and listing Krishna Bharat, Stephen Lawrence, Mehran Sahami and Amit Singhal as inventors; U.S. patent application Ser. No. 10/610,322 (incorporated herein, in its entirety, by reference and referred to as "the '322 application"), titled "RENDERING ADVERTISEMENTS WITH DOCUMENTS HAVING ONE OR MORE TOPICS USING USER TOPIC INTEREST INFORMATION", filed on Jun. 30, 2003 and listing Krishna Bharat as the inventor; U.S. patent application Ser. No. 10/877,790 (incorporated herein, in its entirety, by reference and referred to as "the 790 application"), titled "COST DISCOUNTING TO PROVIDE DOMINANT PARTICIPATION STRATEGY ARBITRATION FOR ONLINE ADVERTISING AND ARBITRATIONS SUPPORTING OFFERS FROM DIFFERENT COST DISCOUNTING METHODOLOGIES", filed on Jun. 25, 2004 and listing John Lamping, Robert Shillingsburg and Eric Veach as inventors; U.S. patent application Ser. No. 11/169,323 (incorporated herein, in its entirety, by reference and referred to as "the '323 application"), titled "USING THE UTILITY OF CONFIGURATIONS IN AD SERVING DECISIONS", filed on Jun. 28, 2005 and listing Amit Patel and Hal Varian as inventors; U.S. patent application Ser. No. 11/026,507 (incorporated herein, in its entirety, by reference and referred to as "the '507 application"), titled "GENERATING AND/OR SERVING LOCAL AREA ADVERTISEMENTS, SUCH AS ADVERTISEMENTS FOR DEVICES WITH CALL FUNCTIONALITY", filed on Dec. 30, 2004 and listing Shumeet Baluja and Henry A. Rowley as inventors; U.S. patent application Ser. No. 11/184,053 (incorporated herein, in its entirety, by reference and referred to as "the '053 application"), titled "SELECTING AND/OR SCORING CONTENT-RELEVANT ADVERTISEMENTS", filed on Jul. 18, 2005 and listing Darrell Anderson, Alexander Paul Carobus, Giao Nguyen and Narayanan Shivakumar as inventors; and U.S. patent application Ser. No. 11/228,583 (incorporated herein, in its entirety, by reference and referred to as "the '583 application"), titled "FLEXIBLE ADVERTISING SYSTEM WHICH ALLOWS ADVERTISERS WITH DIFFERENT VALUE PROPOSITIONS TO EXPRESS SUCH VALUE PROPOSITIONS TO THE ADVERTISING SYSTEM", filed on Sep. 16, 2005, and listing Sumit Agarwal, Gregory Joseph Badros, and John Fu as inventors.

FIG. 7 illustrates an exemplary data structure 700 for storing ad information in a manner consistent with the present invention. As shown, the data structure 700 may include a plurality of entries corresponding to a plurality of rows. Each entry may include an ad identifier 710, an ad creative 720, targeting information 730, price information 740 and/or performance information 750. The targeting information 730 may include, for example, one or more of keywords, vertical categories, genres, concepts, video program identifiers, video server identifiers, user identifiers, user types, languages, stations, locations, times, dates, client devices, other serving constraints, etc. The targeting information 730 may be provided by the advertiser. Alternatively, or in addition, the targeting information 730 may be derived from the ad creative and/or information associated with the ad such as an ad landing page. The price information 740 may be, for example, a price per impression, a maximum price per impression, a price per selection, a maximum price per selection, a price per conversion, a maximum price per conversion, etc. The performance information 750 may be, for example, a selection rate, a call-through rate, a message-through rate, a conversion rate, end user ratings, etc.

§ 4.3.2 Exemplary Apparatus

Figure 12:
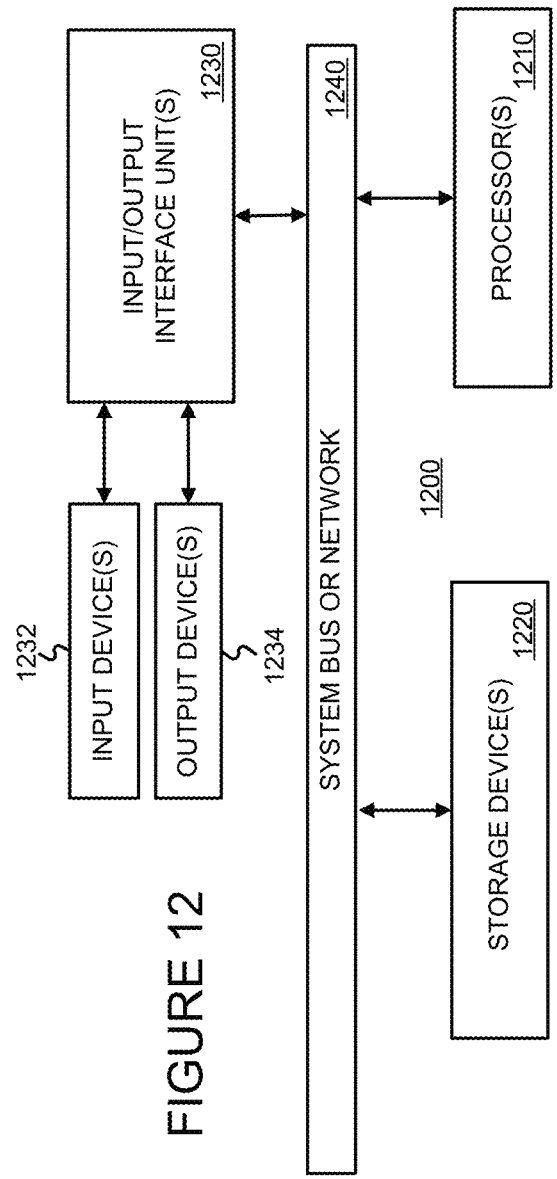
FIG. 12 is a block diagram of apparatus that may be used to perform at least some operations, and store at least some information, in a manner consistent with the present invention.

FIG. 12 is a block diagram of apparatus 1200 that may be used to perform at least some operations, and store at least some information, in a manner consistent with the present invention. The apparatus 1200 basically includes one or more processors 1210, one or more input/output interface units 1230, one or more storage devices 1220, and one or more system buses and/or networks 1240 for facilitating the communication of information among the coupled elements. One or more input devices 1232 and one or more output devices 1234 may be coupled with the one or more input/output interfaces 1230.

The one or more processors 1210 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to perform one or more aspects of the present invention. At least a portion of the machine executable instructions may be stored (temporarily or more permanently) on the one or more storage devices 1220 and/or may be received from an external source via one or more input interface units 1230.

In one embodiment, the machine 1200 may be one or more conventional personal computers. In this case, the processing units 1210 may be one or more microprocessors. The bus 1240 may include a system bus. The storage devices 1220 may include system memory, such as read only memory (ROM) and/or random access memory (RAM). The storage devices 1220 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 1232, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 1210 through an appropriate interface 1230 coupled to the system bus 1240. The output devices 1234 may include a monitor or other type of display device, which may also be connected to the system bus 1240 via an appropriate interface. In addition to (or instead of) the monitor, the personal computer may include other (peripheral) output devices (not shown), such as speakers and printers for example.

Referring back to FIG. 3, one or more machines 1200 may be used as end user client devices 350, content servers 330, audio content servers 360, telephone service provider facilities 370, search engines 320, e-mail (or v-mail) servers 340, and/or ad servers 310.

§ 4.3.3 Refinements and Alternatives

Referring back to operations 410 of FIG. 4, relevancy information may be provided by the video publisher before the video document is served (e.g., broadcast, multicast, unicast, transferred, etc.). If the video document has been previously saved (e.g., previously recorded), it can be analyzed before it is served (and perhaps re-analyzed during serving and/or playback). If the video document is being served live, it may be analyzed as it is being served (perhaps shortly before it is decoded and played at a client device).

Referring back to operations 420 of FIG. 4, ad spots may be provided, separate from the video document, by the video publisher before the video document is served. Alternatively, or in addition, ad spots may be determined based on information encoded in the video document (e.g., well before the occurrence of the ad spot, or just before the ad spot). Thus, for example, a video document may, early on, encode the fact that there are three (3) two-minute ad spots at 20 minutes, 40 minutes and 55 minutes into the document. As another example, a video document may encode the fact that there is a two-minute ad spot in 10 seconds, 19 minutes and 50 seconds into the document. Such encoding may be in the form of markers, text information in video packets or video stream packets, executable code (e.g., Javascript) to call an ad server, etc.

Note that since, in some cases, video documents can be downloaded on demand, the length of the video document may be varied to accommodate more or less ad spots. For example, if there are a lot of very relevant ads, and/or the advertisers are willing to spend a lot for impressions, more ad spot time may be provided. Thus, a ratio of video content time-to-ad time may be decreased or increased depending on one or more of (A) a degree of ad relevancy, (B) a revenue benefit of having more ad spots, (C) a decrease in user utility (e.g., user annoyance) at having more ad spots, (D) a level of user demand for the content, (E) an extent of end user funding of the content, etc. Thus, end user utility can be balanced against advertising revenues.

If the video document has been previously saved (e.g., previously recorded), an arbitration to determine ads to be served in various ad spots may occur before the video document is served (e.g., broadcast, multicast, unicast, transferred, etc.). If the video document is being served live, the arbitration may take place as it is being served (perhaps shortly before it is decoded and played at a client device). If the video document is downloaded (e.g., using some transfer protocol such as FTP), the document may include executable code to initiate an ad arbitration when the video document is played (e.g., when a play is initiated). In any case, ads may be provided with (e.g., inserted into) the video document (e.g., a stream carrying the video content) after the arbitration. If the video document has been previously saved, all ad spots in the video document may be arbitrated one time. In this way, ad spots at parts of the video document in higher demand (e.g., the start of the video document) may be filled with higher scoring ads.

A video document may be divided into segments, each including ad spots. In such an embodiment, each segment may be considered to be a video document itself. Relevant ads may be determined on the basis of a particular video segment, or both the particular video segment (e.g., weighted more) and the video document as a whole (e.g., weighted less). Similarly, relevancy information may be weighted based on a timing of transcriptions within a segment or within a video document. For example, a topic that is temporally closer to an ad spot may be weighted more than a topic or topics (perhaps in the same segment), that is temporally farther from the ad spot.

The ad information may include whether or not the advertiser wants or consents to its ad being served more than one time in a given video document (instance). For example, an advertiser might specify that its ad is to be served no more than N times with an instance of a video document (e.g., a unicast video stream). Alternatively, or in addition, the advertising network and/or the video document publisher may implement policies which limit the number of times a given advertisement can be served with an instance of a video document.

Although many of the examples were described in the context of offers (or maximum offers) per impression, embodiments consistent with the present invention may consider other offers such as offers (or maximum offers) per user selection (or call, or messaging, etc.), offers (or maximum offers) per conversion (e.g., telephone call, item purchase, item order, etc.). Similarly, scoring may be a function of one or more offers and perhaps the likelihood of one or more user actions. Although ad scoring may reflect an expected cost per impression (e.g., bid per impression, bid per selection*selection rate or probability, bid per conversion*conversion rate or probability, etc.), other techniques for scoring ads may be used. Such techniques may consider end user utility (e.g., relevance, annoyance factor, etc.) of an ad.

Although some of the embodiments consistent with the present invention described inserting a video advertisement within a video document, the advertisement may be in other formats and may be served with a video document. For example, a text advertisement, an image advertisement, an audio only advertisement, etc. might be played with a video document. Thus, although the format of the ad may match that of the video document with which it is served, the format of the ad need not match that of the video document. The ad may be rendered in the same screen position as the video content, or in a different screen position (e.g., adjacent to the video content). A video ad may include video components, as well as additional components (e.g., text, audio, etc.). Such additional components may be rendered on the same display as the video components, and/or on some other output means of the client device. Similarly, video ads may be played with non-video documents (e.g., in Iframes of a Webpage) in a manner consistent with the present invention.

Although FIGS. 4 and 10 described determining relevant ads for a given video document, embodiments consistent with the present invention may be used to determine video documents (or ad spots thereof) relevant to a given ad. For example, an advertiser may be presented with video documents considered to be relevant to its ad. The documents may be ordered using such relevance. The advertiser may elect to try to have its advertisement served with a video document or documents (or with an ad spot(s) thereof). The advertiser may express such an election(s) as an offer to have its ad served with the document(s). Other advertisers may do the same. When the video document is served, contention among ads that are eligible to be served with the video document may be arbitrated (e.g., using an auction).

Ad-based revenue may be shared between the ad serving network and the video publisher. The video publisher may collect money from end users on a subscription basis, on a per download basis, and/or a per rendering basis. Ad revenue shared with the video publisher may be used to subsidize (e.g., reduce or eliminate) user costs. In fact, ad revenue (e.g., ad network's share and/or audio publisher's share) may be used to pay users to download or render video documents including ads. For example, if a user normally pays $1.00 to download a music video, the user might be charged less (or nothing, or actually paid) to download the music video with one or more advertisements. Advertising revenues may be used to subsidize other content and/or services such as video-voice-mail, video-live chat, music video, music video plays, video program (e.g., television show episode, television show season, movie, etc.) downloads, video program plays, video-communications services, etc.

Arbitrations in embodiments consistent with the present invention may be performed on a per-broadcast (or per-multicast) basis, or on a per-serve or per-download basis. Performing arbitrations on a per-serve or per-download basis has the potential to generate more revenue. For example, under a per-broadcast agreement on a video document with 100,000 ad spots, if advertiser A is willing to pay $5.00/impression, with a budget limit of $50,000.00, advertiser B is willing to pay $2.00/impression, with a budget limit of $60,000.00, and advertiser C is willing to pay $1.00/impression, with a budget limit of $100,000.00, ad C would be served 100,000 times, netting $100,000.00. On the other hand, under a per ad spot arbitration, ad A would be served 10,000 times, ad B would be served 30,000 times and ad C would be served 60,000 times, netting $170,000.00 ($50,000.00+$60,000.00+$60,000.00).

Note that there are many sources of video documents with which ads may be served. As a first example, the advertising network itself may host a video server. As a second example, larger and smaller Websites that provide video content may partner with the advertising network. As a third example, other providers of documents (e.g., Web pages, email, etc.)

may partner with an advertising network to show video ads. Exemplary business methods used in these various contexts are described below.

The advertising network itself may provide a video server hosting third party videos (e.g., Google video). Content providers on an advertising network hosted Website, as well as the advertising network itself, may both benefit through ad revenue sharing. As another example, the advertising network may receive all of the ad revenue, with the content provider receiving the benefit of having their video(s) hosted for free, or at a subsidized or reduced cost.

A larger Website that provides video content may partner with the advertising network. For example, ABCnews.com may play news clips related to the increasing frequency of hurricanes in recent years. Assuming that the Website is an adverting network partner, the advertising network will supply relevant ads for the news clips. For example, Red Cross ads may be targeted to the viewer based on location and include the phone number of the nearest Red Cross office. This permits the Red Cross to use their local cable television advertising on the Web as well. In this case, ABCnews.com will be hosting their own video content, but there will be a server call out to ad servers of the advertising network, from which a video ad will be retrieved and inserted into the ABCnews.com video stream. The larger Website, as well as the advertising network itself, may both benefit through ad revenue sharing.

A smaller Website that provides video content may partner with the advertising network. Smaller Websites may not wish to go through the hassle of hosting their own videos. The advertising network can host the videos on the smaller Website (perhaps provided that they meet with various Terms of Use) and then have the videos with ads show up in an iframe on the smaller Website. The smaller Website, as well as the advertising network itself, may both benefit through ad revenue sharing. As another example, the advertising network may receive all of the ad revenue, with the smaller Website receiving the benefit of having their video (s) hosted for free, or at a subsidized or reduced cost.

Embodiments consistent with the present invention may be used with content other than video content. In this case, a video advertisement(s) may be targeted using the non-video content. For example, a Webpage dealing with car reviews (e.g., Forbes annual luxury car reviews) may host a flash video ad from GM for the latest Cadillac model.

In at least some embodiments, video ads may be played in a (e.g., flash) player having "play", "stop", and "pause" functionality. An amount to be paid by an advertiser may be conditioned upon various user-video ad interactions. For example, if a video ad is stopped within the first N (e.g., N=five) seconds, it might not be considered to be an impression for which the advertiser would be otherwise charged.

Techniques such as those described in U.S. patent application Ser. No. 11/093,422 (referred to as "the '422 application" and incorporated herein, in its entirety, by reference), filed on Mar. 30, 2005, titled: "NETWORKING ADVERTISERS AND AGENTS FOR AD AUTHORING AND/OR AD CAMPAIGN MANAGEMENT", and listing Ross Koningstein and Sumit Agarwal as inventors may be used to help smaller, less sophisticated advertisers to produce video ads. For example, consider a local Italian restaurant that wants to show its locally targeted video ads in the context of an Italian cuisine cooking show. Unfortunately, the restaurant is a small operation and does not have experience generating television ads. When they go to sign-up for video ads, the advertising network may facilitate a relationship with a firm, such as a local firm for example, that can help generate a video creative that can be uploaded to the advertising network for serving.

In at least some embodiments consistent with the present invention, uploaded video files, and/or video ads may be subject to automatic speech recognition, transcoding, thumbnail generation, approval, and/or addition to an index.

§ 4.4 EXAMPLES OF OPERATIONS

Figure 13:
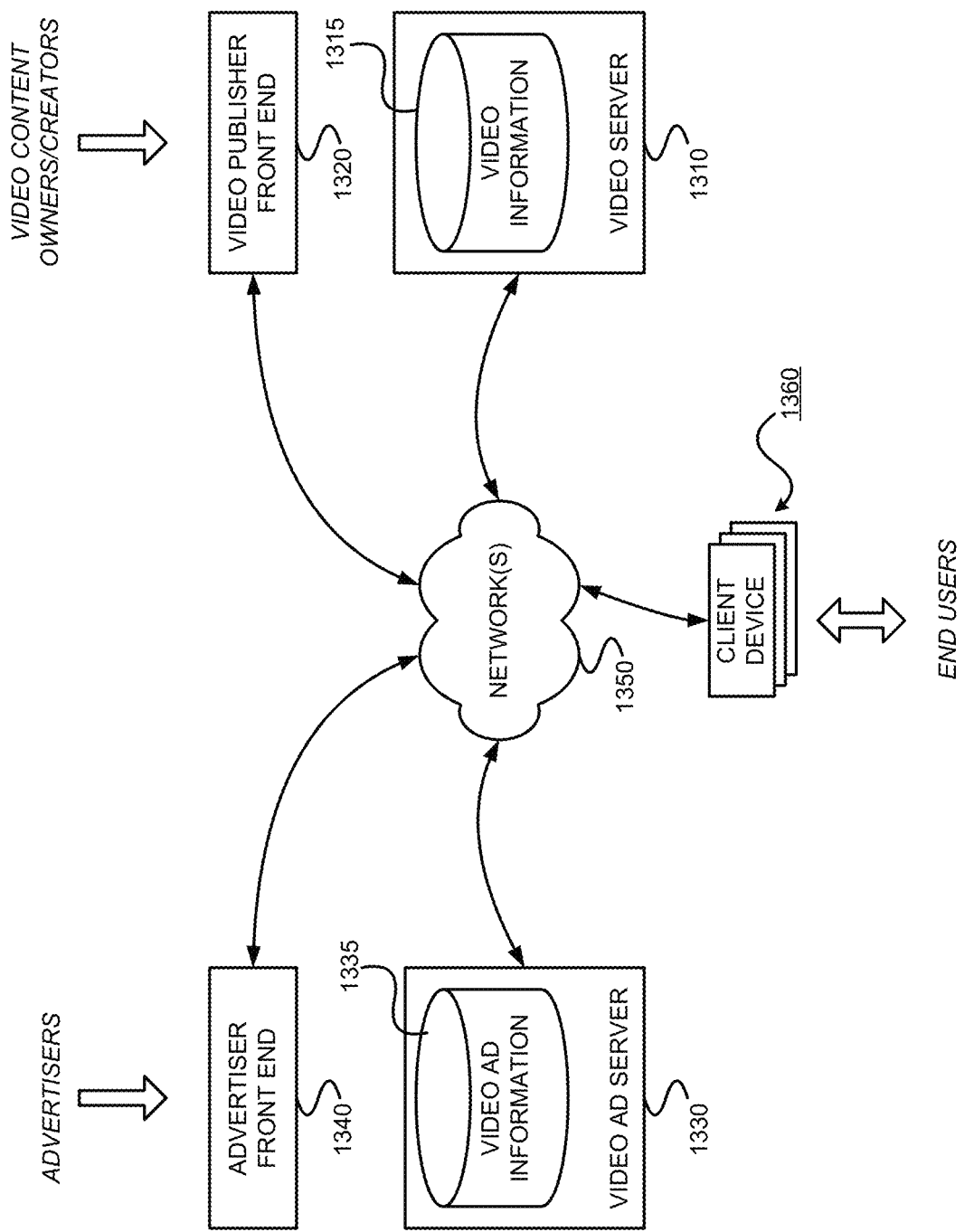
FIG. 13 illustrates an exemplary environment 1300 consistent with the present invention in which video ads are served with video documents.

Examples of operations in an exemplary embodiment consistent with the present invention are described with respect to FIGS. 13-19. FIG. 13 illustrates an exemplary environment 1300 consistent with the present invention in which video ads are served with video documents. The environment 1300 includes a video server 1310, a video publisher front end 1320, a video ad server 1330, an advertiser front end 1340, and client devices 1360, all of which may communicate with one another via one or more networks 1350, such as the Internet for example. Video content owners/creators may use the video publisher front end 1320 to store video information 1315 on video server 1310. Advertisers may use the advertiser front end 1340 to store video ad information 1335 on video ad server 1330. When a client device 1360 loads or plays a video document (e.g., from video server 1310) that participates in the advertising network, the video ad server 1330 may determine one or more video ads to be served with the video document.

Figures 14, 15:
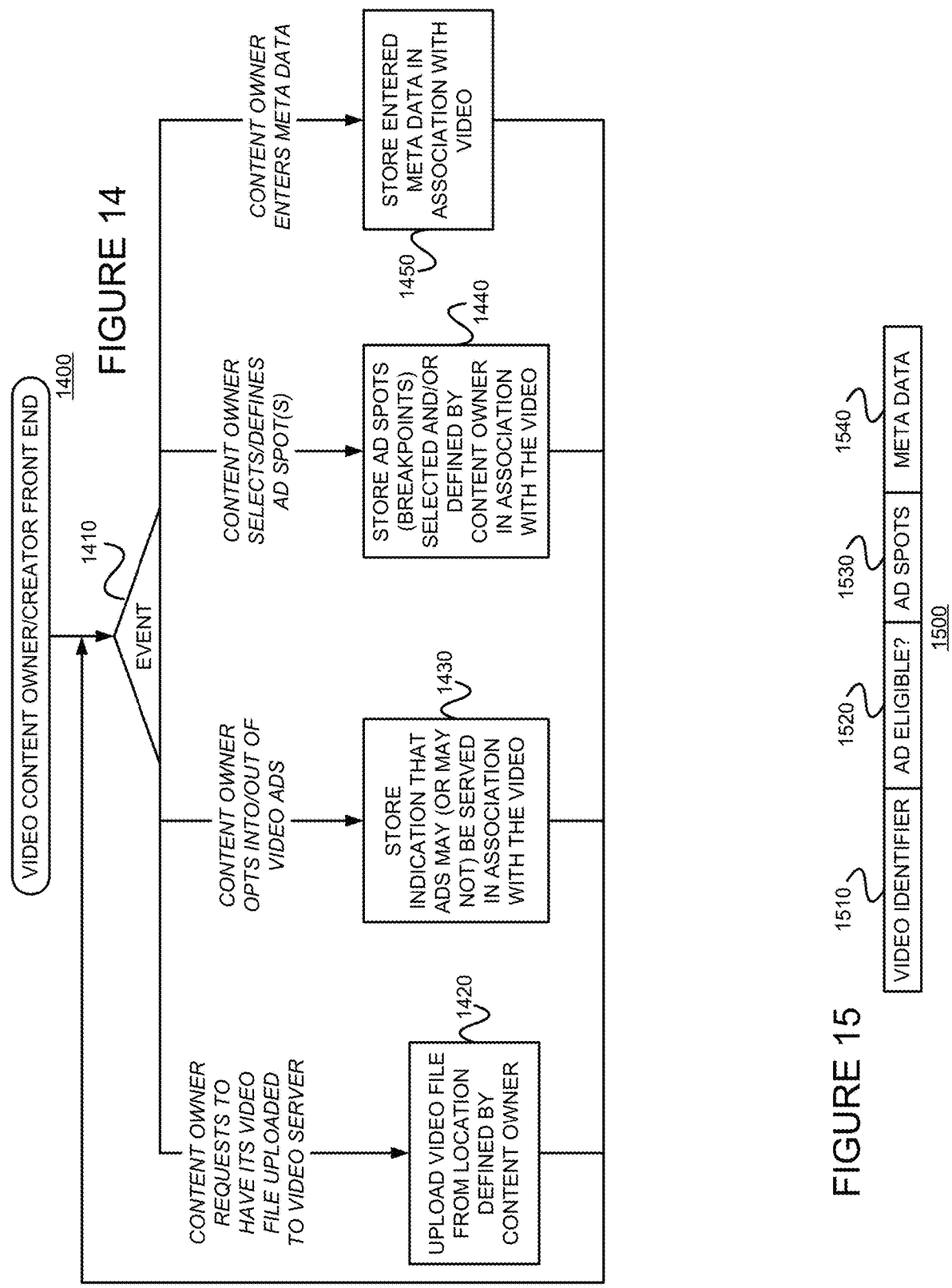
FIG. 14 is a flow diagram of an exemplary method 1400 for providing a video content owner/creator front end in a manner consistent with the present invention.
FIG. 15 is an exemplary set of information 1500 that may be stored, either together as a record, or in association with a video identifier, once a video content owner/creator enters necessary information via a front end method such as that 1400 described with respect to FIG. 14.

FIG. 14 is a flow diagram of an exemplary method 1400 for providing a video content owner/creator front end in a manner consistent with the present invention. As indicated by event block 1410, various branches of the method 1400 may be performed in response to various events. For example, if a content owner requests to have its video file uploaded to a video server, the video file may be uploaded from a location defined by the content owner. (Block 1420) Referring back to event block 1410, if a content owner opts into (or out of) showing video ads, an indication that ads may be (or may not be) served in association with the video is stored. (Block 1430) Referring back to event block 1410, if a content owner selects or defines one or more ad spots, the ad spots selected and/or defined by the content owner are stored in association with the video. (Block 1440) Referring back to event block 1410, if a content owner enters metadata, the Meta data is stored in association with the video. (Block 1450)

At least some embodiments consistent with the present invention may be used in the context of a server permitting hosted videos to be searched. Such embodiments may include one or more of the following features. Users may be able to click through to a Website associated with an uploaded video. For example, the content owner can add a URL and other information to the uploaded video via its Video Status page in its account. Once the video is available on the hosted Website, users will be able to click the provided URL to visit the Website.

At least some embodiments consistent with the present invention may allow video content owners to add a transcript and additional video information, for example by visiting a video status page and clicking an "Add Transcript" button. If the uploaded videos are to be searchable, users will be able to find a video more easily if a transcript is added to each video file uploaded. It may be preferred if the format of the transcript is time-coded and saved as a .txt file. A time-coded transcript breaks the script of the video into segments. Each segment includes the time the words in the script are being said in the video followed by the actual words of the script. For example, the time of each segment may be listed in the following format: HH:MM:SS.mmm HH: Hours starting at 00
MM: Minutes starting at 00
SS: Seconds starting at 00
mmm: Milliseconds starting at 000

An example of how the time-coded transcript should appear is provided below:

9:54:50.000
Words said between 09:54:50.000 and 09:54:53.000
9:54:53.000
Words said between 09:54:53.000 and the next segment.
9:54:54.000
Words said at 09:54:54.000

Each timestamp is relative to the start of the associated video file. Various transcription companies support this. Such companies include, for example, Automatic Sync Technologies, Talking Type Captions and Rhino Moon Captioning.

Video formats may include, for example, each file in MPEG4 format with MP3 audio or MPEG2 with MP3, QuickTime, Windows Media, and RealVideo. There may be preferred video specifications and/or requirements such as, for example, NTSC (4:3) size and frame rate, deinterlaced,
Video Codec: MPEG2 or MPEG4 (MPEG4 preferred),
Video Bit rate: at least 260 Kbps (750 kbps preferred),
Audio Codec: MP3 vbr, Audio Bit rate: at least 70 Kbps (128 Kbps preferred),
the video must contain recognizable video content (video container files that do not contain video will not be accepted),
the frame rate should be above 12 frames per second,
the video metadata must be accurate and relevant to the content uploaded (no spam),
the video must be at least 10 seconds long,
etc.

In at least some embodiments consistent with the present invention, the video publisher front end may allow the video publisher to remove its videos after they have been uploaded.

In at least some embodiments consistent with the present invention, the video publisher front end may allow the video publisher to specify any price for its video. The price may be set to zero to allow users to access and play the video for free.

In at least some embodiments consistent with the present invention, the video hosting server may charge users a fee (if the video publisher specified zero as the price for its video) or take a larger revenue share of the price (if the video publisher has set a price greater than zero for its video). For example, if the video publisher uploads a high definition file that's 500 MB and becomes extremely popular, the video hosting server might charge users a fee instead of giving it to them for free, or ask the video publisher for a higher percentage of the revenue from the price of the video. Preferably, the video publisher will be informed before a price is added, or before a higher revenue share is charged for the video.

FIG. 15 is an exemplary set of information 1500 that may be stored, either together as a record, or in association with a video identifier, once a video content owner/creator enters necessary information via a front end method such as that 1400 described with respect to FIG. 14. The set of information 1500 may include a field 1510 for storing a video identifier, a field 1520 for storing an indication of whether or not ads may be served with the video, a field 1530 for storing information (e.g., absolute or relative times, start and stop times, start times and durations, etc.) about one or more ad spots, and a field 1540 for storing meta data 1540. Naturally, less or more information may be stored, and other data structures may be used.

Using the method 1400 of FIG. 14, each whole video may have the option to have ads inserted into it at various breakpoints defined by the party that uploaded the content (e.g., the content owner). The content owner can opt-in to show ads at the time of file upload and also enable them at a later time from the content owner front end interface. In at least some embodiments consistent with the present invention, the content owner can disable ads for the piece of content.

Referring back to both block 1450 of FIG. 14 and field 1540 of FIG. 15, in at least some embodiments consistent with the present invention, the content owner may be asked to provide some or all of the following pieces of information for the content that they uploaded: title; description; transcript; Tribune Metadata (if applicable); and recommended viewing demographic. If the content owner is also serving the video (e.g., a television broadcaster), they may provide additional information such as, for example, one or more of broadcast locations covered, time of day, day of week, time of year, audience information such as demographics, etc.

Referring back to FIG. 1420, in at least some embodiments consistent with the present invention, videos uploaded may be checked for compliance with Terms of Service (e.g., no pornography, no alcohol, etc.).

Figure 16:
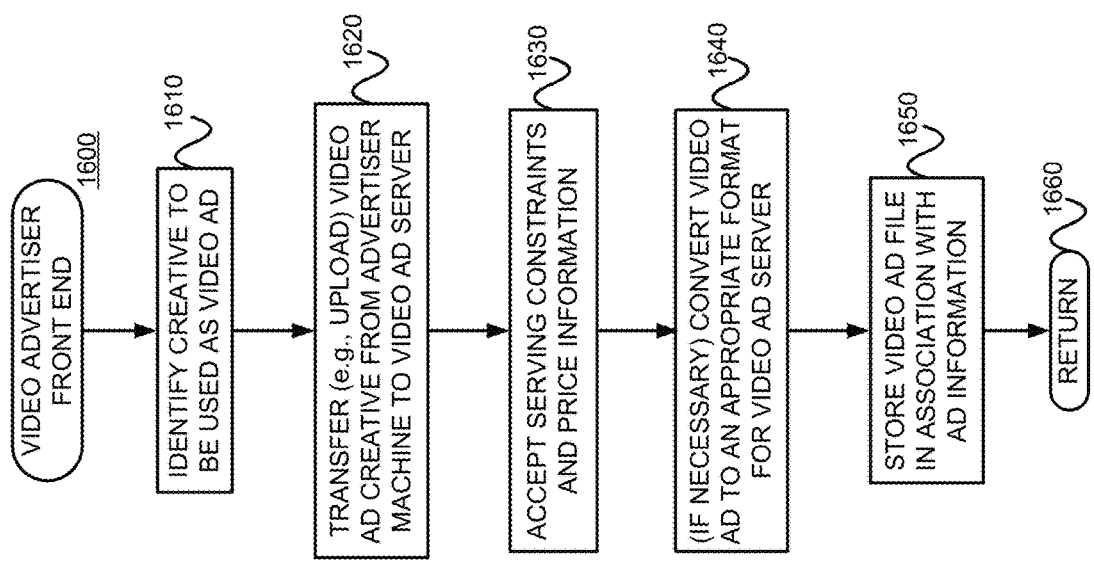
FIG. 16 is a flow diagram of an exemplary method 1600 for providing a video advertiser front end in a manner consistent with the present invention.

FIG. 16 is a flow diagram of an exemplary method 1600 for providing a video advertiser front end in a manner consistent with the present invention. A creative to be used as a video ad is identified by the advertiser. (Block 1610) The identified video is then transferred (e.g., uploaded) from the advertiser's machine (e.g., personal computer) to the video ad server. (Block 1620) Service constraints and price information may be accepted from the advertiser. (Block 1630) If necessary, the video ad is converted to an appropriate format for the video ad server. (Block 1640) Finally, the video ad file is stored in association with ad information (e.g., serving constraints and price information) (Block 1650) before the method 1600 is left (Node 1660).

Referring back to block 1630 of FIG. 16, the serving constraints may be one or more of: keywords (to match the metadata of a given video document); Website-targeting from the advertiser to place an ad (and charge advertisers on a cost per impression basis); geolocation targeting (e.g., country, region, city, zip code); demographics; vertical categories, etc.

Referring back to block 1640, video ads in one format (e.g., MPEG) may be converted to another format (e.g., Flash). For example, General Motors (GM) may want to upload new ads for their new line of Pontiac cars, and have them displayed in both (1) a video stream next to NASCAR clips on the Web and (2) Websites which post reviews of their new line of cars. GM may upload an MPEG version of a video ad and the advertising network may automatically convert the MPEG video to a Flash video. The MPEG version of the video ad may then be inserted into those video streams across the Web that fit GM's Website targeting and keyword match for video. In addition, the Flash video ads may be used in similar context for Web pages with non-video stream content (e.g., static web pages). In at least some embodiments consistent with the present invention, the video ads may undergo one or more of audio-volume normalization, automatic speech recognition, transcoding, thumbnail generation, approval review, addition to index, etc.

Techniques such as those described in U.S. patent application Ser. No. 11/112,732 (referred to as "the '732 patent" and incorporated herein, in its entirety, by reference), filed on Apr. 22, 2005, titled "SUGGESTING TARGETING INFORMATION FOR ADS, SUCH AS WEBSITES AND/OR CATEGORIES OF WEBSITES FOR EXAMPLE", and listing Sumit AGARWAL, Brian AXE, David GEHRKING, Ching LAW, Andrew MAXWELL, Gokul RAJARAM, and Leora WISEMAN as inventors may be used to suggest Websites. In at least some embodiments consistent with the present invention, all of the Websites in the tool must have video content that is compatible with the video ad serving system. In at least some embodiments consistent with the present invention, the advertiser may choose from a list of Websites which is generated after the advertiser has entered keywords, concepts, and/or vertical categories, etc. These keywords will match the metadata for the video content. In at least some embodiments consistent with the present invention, a message will appear in the advertiser's e-mailbox whenever there is a new Website with video content that fits the adgroup.

Referring back to block 1650 and FIG. 7, video ads and video ad information may be stored in various ways. For example, in at least some embodiments consistent with the present invention, multiple video ad files may be concatenated together in larger video file server (VFS) "packs", to help with VFS performance. More specifically, to handle the potential proliferation of small video files, multiple video files can be stored in single VFS file called a "bundle" or a "pack". If an AVI indexer stores individual video files in VFS, it should be provided with the additional capability of inserting into a VFS bundle, and recording the video offsets within the bundle. This may be implemented with a command-line tool (referred to as "the PackerIndexer"). This tool stuffs multiple video ad files into a VFS pack, and also enters the file serving information into an index. This may be done by (i) copying the file into the pack, (ii) noting the file offsets within the pack, (iii) updating the index with the serving information. The index key may be (content-id, format) where "format" is derived from looking at the video file (e.g., AVI-320). The index may contain the VFS bundle filename. The chunk offsets may represent the absolute seek position into the pack. In at least one embodiment consistent with the present invention, a set of M packs may be maintained. In such an embodiment, the pack name may be determined by hashing the video content-id modulo M.

In at least some embodiments consistent with the present invention, video ads may be stored in the same data structures or data bases as other types of ads (e.g., text-only ads). In such embodiments, columns that enumerate the creative formats (text, image, video, Flash video, etc.) may include values corresponding to video creative formats.

In at least some embodiments consistent with the present invention, the time duration of the ad may be considered during an arbitration. A field (video_duration_ms) may be used to permit the call for video ads to limit the time duration of the video ads returned. The arbitration may optimize (e.g., maximize) a value (e.g., expected revenue per ad spot or per video document ad spots) given an ad spot duration constraint (and perhaps other constraints).

Figure 17:
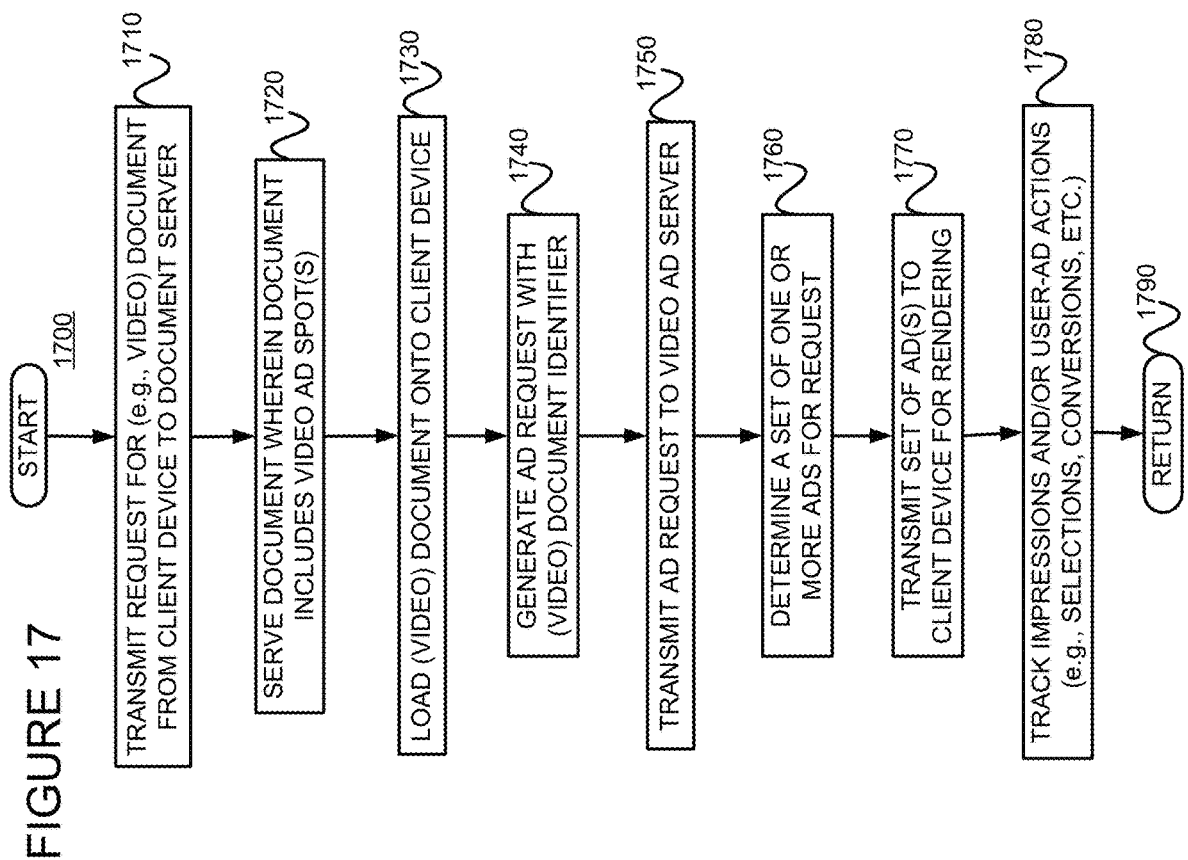
FIG. 17 is a flow diagram of an exemplary method 1700 for serving video ads with video content in a manner consistent with the present invention.
Figure 18:
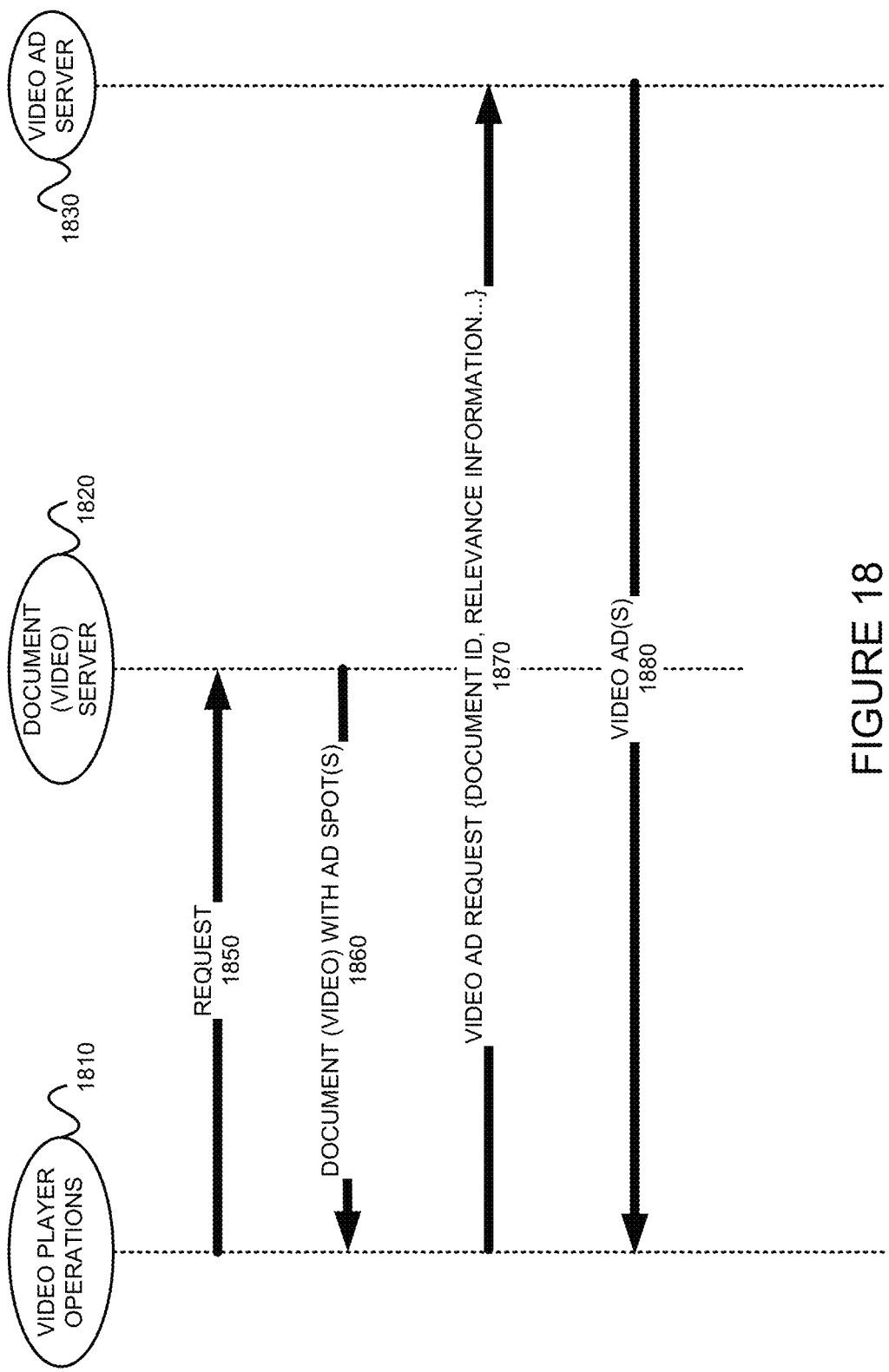
FIG. 18 is a messaging diagram illustrating the serving of video ads with video content in a manner consistent with the present invention.

Once video documents are available to be served, and advertisers have entered video ads, the environment 1300 of FIG. 13 may serve video ads with video documents. FIG. 17 is a flow diagram of an exemplary method 1700 for serving video ads with (e.g., hosted) video content in a manner consistent with the present invention. The acts of FIG. 17 are described in association with the messaging diagram of FIG. 18. A request for a video document is transmitted from a client device to a document server to a document server. (Block 1710 and message 1850) In response, the video document server serves a video document which includes one or more ad spots to the requesting client device. (Block 1720 and message 1860) The video document is loaded onto the client device. (Block 1730) Code inserted into the video document is executed by the client device (e.g., a browser or video player) to generate an ad request. (Block 1740) The ad request may include one or more of (i) a video document identifier, (ii) meta-data about the video document, (iii) location information about the client device (e.g., an Internet protocol address, a language selection), (iv) user information, (v) a number of ads needed, (vi) when the ads are needed, (vii) a duration of ads needed, (viii) video owner blocking information, (ix) a video owner identifier, (x) information that may be used to lookup any of the foregoing, etc. The ad request is transmitted to the video ad server. (Block 1750 and message 1870) The video ad server determines a set of one or more relevant ads for the request. (Block 1760) The video ad server may then transmit the determined set of ads to the client device for rendering. (Block 1770 and message 1880) Impressions and/or user-ad actions (e.g., selections, conversions, etc.) may be tracked. (Block 1780)

Referring back to block 1760, relevant ads may be determined by comparing the video document metadata (e.g., title, description, transcript, tribune metadata, demographic data about the video, time/date information, audience location information, audience demographic information, etc.) to serving constraints and/or relevance information (e.g., terms, concepts, clusters, vertical categories, etc.) associated with the various ads. If there are too many relevant ads for the number of ad spots, the ads may be scored (e.g., as a function of price, relevance, and/or performance, etc.) to determine a final set of ads to be served with the video document. Recall that some or all of the metadata is provided to the video ad server during the playback of the video document so that the ad server can determine relevant ads. This may be done by annotating (either in-line, an XML feed, or some other data interchange mechanism) a Web page on which the video document is linked.

Still referring to block 1760, in at least some embodiments consistent with the present invention, once the ad is in the system, it will be served similarly to the way content ads are served as described in the '900 application. However, the client for the ad is expected to be either a Flash client, or a video-on-demand server at a cable headend. The client may pass a video content identifier which may be used to lookup information about the video content. Alternatively, or in addition, the client may pass information about the video content. For example, to allow for the case where there is no content identifier available to the client (e.g., in the case of syndication) content and/or other document information (e.g., a transcript of the video, embedded structured data such as title, description, genre, etc.) may be passed to the video ad sever instead. In either case, the information about the video content may be used to target the video ads.

Still referring to block 1760, in at least some embodiments consistent with the present invention, uploaded video ads may be ignored (or deemed ineligible to participate in an arbitration, or be served) until they are transcoded and/or approved.

Figure 19:
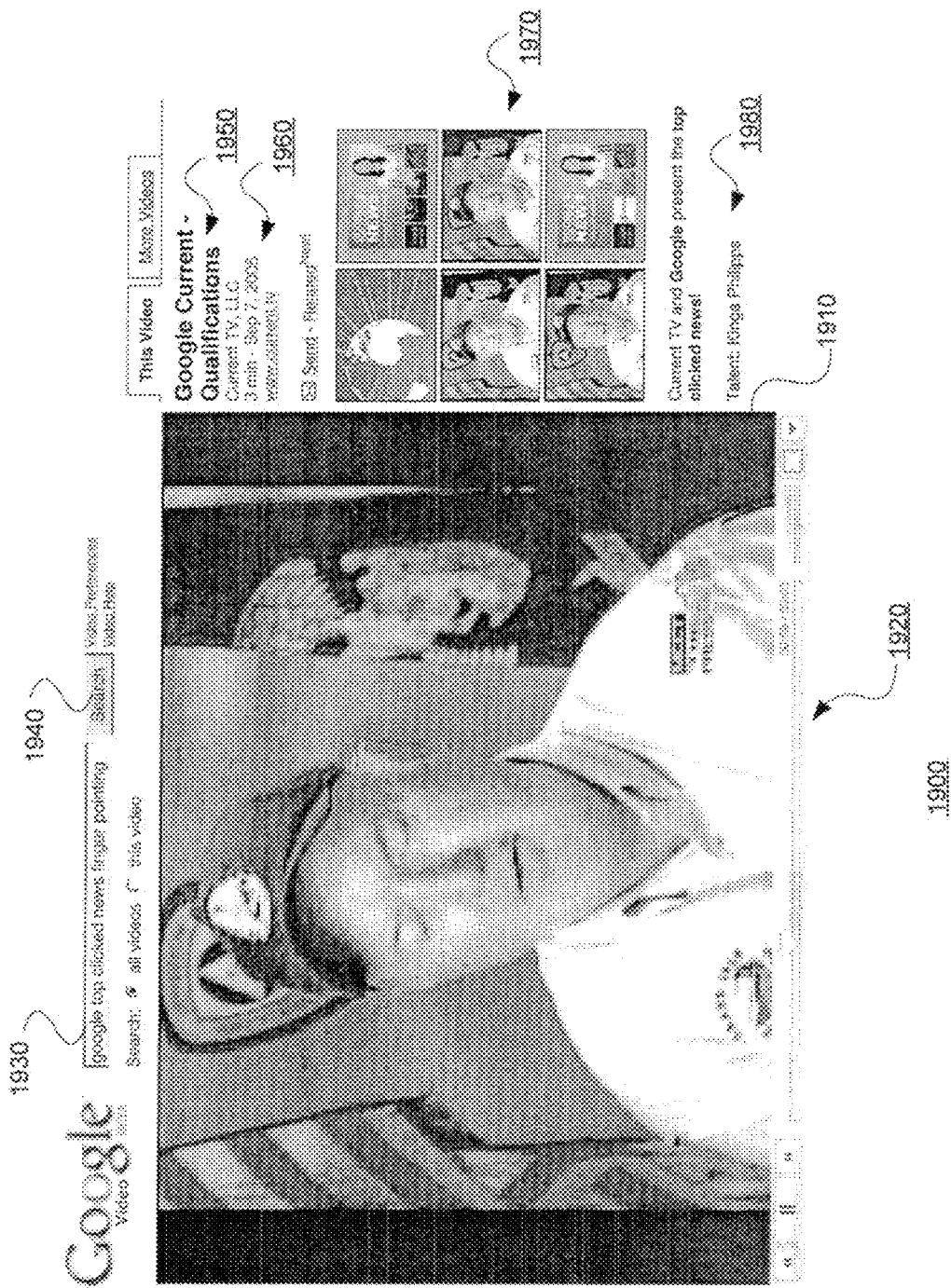
FIG. 19 illustrates an exemplary hosted Web page, including a video player that may be used to play videos and video ads in a manner consistent with the present invention.

FIG. 19 illustrates an exemplary video player Web page 1900 which may be used in embodiments consistent with the present invention. The page may include a video content portion 1910 with video player controls (e.g., play, pause, skip, change volume, change screen size, etc.) 1920. The page 1900 may include a title line 1950, related information (e.g., length, time of upload or file creation, URL link) 1960, various frames 1970 extracted from the video stream, and descriptive text 1980. A video search box 1930 and search button 1940 are also shown. In at least some embodiments consistent with the present invention, video ads may be played in the same portion 1910 as the video content. Alternatively, or in addition, (e.g., video) ads can be shown in separate portions. If the ads are audio or video ads, they may play automatically before, during, or after the video content is played, or may be provided with its own player and played only upon user selection. Naturally, other ways of presenting ads and video ads with video content are possible.

In at least some embodiments consistent with the present invention, the ad serving and selection logic may occur in ActionScript embedded in FLV files that are served up from the video server. For example, the server may embed (i) information in the FLV that dictates where the ads should be inserted, and (ii) the video content-id. In such embodiments, the FLV may also include ActionScript code to interpret this information, by fetching the ad URLs and then playing the ad videos using a separate call to the video server for the actual ad file.

In an alternative embodiment consistent with the present invention, the video server may embed ads directly in the video stream. However, in such an embodiment, the server may need to perform on-the-fly frame rate matching (matching ads to the frame rates of uploaded videos.) This may also complicate (or even prevent) showing different ads each time the piece of content is played (e.g., if the user downloads the content to their local hard drive). In this scenario, the server may provide metadata to the individual ads that will be played and when to the player. In this way, the player can treat the video when ads are playing differently, and be able to re-run ad arbitrations when the video is played multiple times.

Recall that ads can be targeted to specific Websites. If there is a site-targeting match between an ad and a piece of video content, then that ad may be inserted into the video stream at predetermined points (e.g., beginning, middle, end—Recall 1530 of FIG. 15.) within the video document.

Recall from block 1780 that user-ad actions may be tracked. In at least some embodiments consistent with the present invention, a video player (e.g., a Macromedia Flash player) may be provisioned so that the user has the option to skip an individual ad. If the ad has not been skipped within a negotiable time period (e.g., five seconds) from its beginning, then the impression for the ad may be considered to be a valid impression. Otherwise, the impression maybe considered invalid or assumed not to have occurred. In at least some embodiments consistent with the present invention, the video player may be provisioned such that the user can pause an ad. This user-ad action may be tracked. Finally, in at least some embodiments consistent with the present invention, the video player may be provisioned such that the user can go back to a previous ad. This user-ad action may be tracked. In at least some embodiments consistent with the present invention, where the user reverts to a previous ad, only the first impression is counted.

In some embodiments consistent with the present invention, a video ad will play by default. In such embodiments, a video player might or might not include a user control to mute and/or stop the ad. In other embodiments consistent with the present invention, a video ad will not play by default, but rather, will only play if the end user enters a play command. In such embodiments, a thumbnail and/or text associated with the ad may be provided, or only a portion of the video ad may be played without an end user entering a play command.

In at least some embodiments consistent with the present invention, the advertiser may be provided with a reporting interface. Reports available to the advertiser may include the number of impressions served, number of selections, number of conversions, etc. and/or any other tracked information.

In at least some embodiments consistent with the present invention, the entity serving the video ads may charge advertisers on the basis of one or more of: (i) impressions; (ii) selections (e.g., if the user clicks on an element within the video while it is playing); (iii) conversions; (iv) a periodic subscription, etc. Impressions may be counted as the video ads are served. Alternatively, a player on the client device may be used to track impressions. For example, an API may be provided from the client (or player) back to the ad serving system, since only the player can determine whether the ad has been played for certain. Thus the advertiser can be charged based on "effective" impressions where the video player has determined that the end user has viewed an ad (and perhaps declined an opportunity to skip it). The advertiser can also be charged as a function (e.g., a linear function, a polynomial function, or an exponential function) of how much of a video ad was played.

The environment 1300 of FIG. 13 assumes that video information 1315 stored on a video server 1310 was entered by video content owners via a video publisher front end 1320. However, embodiments consistent with the present invention may be used to serve (e.g., video) ads with other sources of video content. Examples of other sources of video content include larger partners of the video ad serving system (who are assumed to have a certain degree of technical sophistication), and smaller partners of the video ad serving system (who are assumed to be less sophisticated). Exemplary front end user interfaces for each are described below. In either case, the partner may earn a revenue share of proceeds generated from playing video ads.

Larger Partner Site Front End

For partners that host video on their own Website, the video ad serving system may require that such partners (i) abide by various terms of use, and (ii) include either an in-line annotation for each piece of video content for which they wish to use an ads-for-video (AFV) or an XML feed that can be scanned by the ad serving system and that contains some information from the following metadata (title, description, transcript, Tribune Metadata, demographic data about the video, etc.). As already described above, the metadata may be used to (i) retrieve appropriate video ad(s) from the video ad server and (ii) insert the video ad(s) into the video feed on the partner Website.

In at least some embodiments consistent with the present invention, the partner may be provided with a competitive filter, and/or a contextual filter. In at least some embodiments consistent with the present invention, the partner may be provided with the option to run default ads in the event that there are no appropriate video ads (e.g., ads deemed relevant to the video document on the basis of their serving constraints).

Smaller Partner Site Front End

In at least some embodiments consistent with the present invention, partners who are not hosting video on their own Website, but instead use a third party video server (e.g., a video server affiliated with, or controlled by, the video ad serving system), can show streaming video on their own Website within an iFrame. Rather than resorting to the inline annotation on the Web page, relevant ads may be determined using the metadata associated with the hosted video document and/or relevancy information (e.g., Metadata, terms, concepts, clusters, vertical categories, etc.) of the Web page content. In at least some embodiments consistent with the present invention, all video creatives uploaded to the third party video server may be checked for compliance with terms of service (i.e., no pornography, no alcohol, etc.).

As was the case with the larger partner Website front end, in at least some embodiments consistent with the present invention, the partner may be provided with a competitive filter, and/or a contextual filter. In at least some embodiments consistent with the present invention, the partner may be provided with the option to run default ads in the event that there are no appropriate video ads (e.g., ads deemed relevant to the video document on the basis of their serving constraints).

Delivery of Flash Video Ads for a Text Document (e.g., a Webpage Including Text)

In at least some embodiments consistent with the present invention, a content owner of a text document (e.g., a publisher of a Web page including text) may opt into having targeted video advertisements to be played on their document. For example, document information of the document (e.g., Metadata concepts, clusters, terms, keywords, vertical categories, etc.) may be used to target one or more Flash video ads to be shown in a designated area of the document.

In at least some embodiments consistent with the present invention, flash video ads may be matched to the content of the document (e.g., Web page or Website) and the flash video, along with its player, will be shown in a designated area or areas of the document. In at least some embodiments consistent with the present invention, the Flash video ad player may have one or more of the following pieces of functionality: play button; a pause button; a seek bar which allows the user to navigate within the flash video ad; volume control; and an overlay button on which a user can click to be taken to more information about the product or service. In at least some embodiments consistent with the present invention, the flash video ad player may play additional ad information, such as text information provided by the advertiser and/or extracted from the ad landing page for example.

In at least some embodiments consistent with the present invention, an end user will have to select (e.g., click on) the play button for the flash video ad to begin playing. A click on the play button may be used as evidence of an impression (for purposes of reporting, performance tracking, and/or billing). A click on the more information button or on the flash video itself may be used as evidence of a selection (e.g., a click-through) (for purposes of reporting, performance tracking, and/or billing).

In at least some embodiments consistent with the present invention, initial and/or final thumbnail images (e.g., specified by the advertiser and/or automatically extracted from the video ad) may be associated with the flash video ad. Such thumbnail images can be displayed when the video is not being played (e.g., before a play, or after the whole ad has played).

§ 4.5 CONCLUSIONS

As can be appreciated from the foregoing, embodiments consistent with the present invention can be used to deliver relevant advertisements for video media such as, for example, television, video-voicemail, Webcast, podcast, online voice video-chatting, video-phone conversations, etc. Embodiments consistent with the present invention support arbitrations allowing more advertisers to compete for ad spots on video documents. This increased competition should increase advertising revenues for video document publishers.

What is claimed is:

1. A computer-implemented method of verifying video content presentation, comprising:
receiving, by a secondary video content server having one or more processors, from a client device, a request for video content to be inserted to interrupt a streaming video played at the client device, the request transmitted by the client device responsive to executing embedded code for generating the request in the streaming video subsequent to initiating playing of the streaming video at the client device, the streaming video provided to the client device by a primary video content server;
providing, by the secondary video content server, responsive to receiving the request, a video content item for display in a media player executed on the client device, the media player including an actionable object and configured with an application programming interface (API), a triggering of the actionable object configured to cause the media player: (a) to skip the playing of the video content item at the client device and (b) to communicate with the secondary video content server from the client device via the API an indication of the triggering of the actionable object on the media player, the API accessible to the secondary video content server for identifying interactions with the media player;
detecting, by the secondary video content server in communication with the media player via the API of the media player, the triggering of the actionable object to cause the media player to skip playing of the video content item;
identifying, by the secondary video content server, based on detecting the triggering of the actionable object via the API of the media player, a time duration corresponding to an amount of time between a first time at which the video content item interrupts the streaming video played at the client device and a second time at which the triggering of the actionable object caused the media player to skip the video content item;
determining, by the second video content server, that the time duration is greater than a predetermined time threshold; and
updating, by the second video content server, a counter for the video content item responsive to determining that the time duration is greater than the predetermined time threshold.

2. The computer-implemented method of claim 1, wherein providing, for display, the video content item includes providing the video content item in a content slot of a video document including video content.

3. The computer-implemented method of claim 1, wherein the video content item is transmitted, using the Internet protocol, to the client device via one or more communications networks.

4. The computer-implemented method of claim 1, further comprising responsive to determining that the time duration is not less than the predetermined time duration, determining that the video content item received a valid impression.

5. The computer-implemented method of claim 4, further comprising incrementing the counter responsive to determining that video content item received the valid impression.

6. The computer-implemented method of claim 1, further comprising:
providing, by the server, the media player, the media player including a second actionable object configured to replay the video content item;
detecting, by the server, an action taken on the second actionable object;
providing, by the server, for display, the video content item; and
responsive to determining the action taken on the second actionable object, determining, by the server, that the video content item did not receive a valid impression for providing the video content item for display.

7. A system for verifying video content presentation, comprising:
a secondary video content server comprising a memory storing processor-executable instructions and a processor coupled to the memory, configured to:
receive, from a client device, a request for video content to be inserted to interrupt a streaming video played at the client device, the request transmitted by the client device responsive to executing embedded code for generating the request in the streaming video subsequent to initiating playing of the streaming video at the client device, the streaming video provided to the client device by a primary video content server;
provide, responsive to receiving the request a video content item for display in a media player executed on the client device, the media player including an actionable object and configured with an application programming interface (API), a triggering of the actionable object configured to cause the media player: (a) to skip the rendering of the video content item at the client device and (b) to communicate with the secondary video content server from the client device via the API an indication of the triggering of the actionable object on the media player, the API accessible to the secondary video content server for identifying interactions with the media player;
detect, in communication with the media player via the API of the media player, the triggering of the actionable object to cause the media player to skip playing of the video content item;
identify, based on detecting the triggering of the actionable object via the API of the media player, a time duration corresponding to an amount of time between a first time at which the video content item interrupts the streaming video played at the client device and a second time at which the triggering of the actionable object caused the media player to skip the video content item;
determine that the time duration is greater than a predetermined time threshold; and
update a counter for the video content item responsive to determining that the time duration is greater than the predetermined time threshold.

8. The system of claim 7, wherein the server is further configured to provide the video content item in a content slot of a video document including video content.

9. The system of claim 7, wherein the server transmits the video content item, using the Internet protocol, to the client device via one or more communications networks.

10. The system of claim 7, wherein the server is further configured to determine that the video ad receives a valid impression responsive to determining that the time duration is not less than the predetermined time threshold.

11. The system of claim 10, wherein the server is further configured to increment the counter responsive video content item receiving the valid impression.

12. The system of claim 7, wherein the server is further configured to:
provide the media player for display, the media player configured to include a second actionable object configured to cause the media player to replay the video content item;
detect an action taken on the second actionable object;
provide, for display, the video content item; and
responsive to determining the action taken on the second actionable object, determine that the video content item did not receive a valid impression for providing the video content item for display.

13. A non-transitory computer readable storage medium, having computer-executable instructions stored thereon, which when executed by a computer, cause the computer to:
receive, from a client device, a request for video content to be inserted to interrupt a streaming video played at the client device, the request transmitted by the client device responsive to executing embedded code for generating the request in the streaming video subsequent to initiating playing of the streaming video at the client device, the streaming video provided to the client device by a primary video content server;
provide, responsive to receiving the request, a video content item for display in a media player executed on the client device, the media player including an actionable object and configured with an application programming interface (API), a triggering of the actionable object configured to cause the media player: (a) to skip the playing of the video content item at the client device and (b) to communicate with the secondary video content server from the client device via the API an indication of the triggering of the actionable object on the media player, the API accessible to the secondary video content server for identifying interactions with the media player;
detect, in communication with the media player via the API of the media player, the triggering of the actionable object to cause the media player to skip playing of the video content item;
identify, based on the detection of the triggering of the actionable object via the API of the media player, a time duration corresponding to an amount of time between a first time at which the video content item interrupts the streaming video played at the client device and a second time at which the triggering of the actionable object caused the media player to skip the video content item; and
determine that the time duration is greater than a predetermined time threshold to verify delivery and display of the video content item at the client device; and
update a counter for the video content item responsive to determining that the time duration is greater than the predetermined time threshold.

14. The non-transitory computer readable storage medium of claim 13, wherein the instructions further include determining that the video content item receives a valid impression responsive to determining that the time duration is not less than the predetermined time duration.

* * * * *